(12) United States Patent
Ishikawa

(10) Patent No.: US 8,379,923 B2
(45) Date of Patent: Feb. 19, 2013

(54) IMAGE RECOGNITION PROCESSING DEVICE, METHOD, AND PROGRAM FOR PROCESSING OF IMAGE INFORMATION OBTAINED BY IMAGING THE SURROUNDING AREA OF A VEHICLE

(75) Inventor: Tomoaki Ishikawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1134 days.

(21) Appl. No.: 12/292,132

(22) Filed: Nov. 12, 2008

(65) Prior Publication Data

US 2009/0169055 A1 Jul. 2, 2009

(30) Foreign Application Priority Data

Dec. 27, 2007 (JP) ................... 2007-337454

(51) Int. Cl.
*G06K 9/00* (2006.01)
*G08G 1/09* (2006.01)
(52) U.S. Cl. ....................... 382/104; 701/207
(58) Field of Classification Search .......... None
See application file for complete search history.

(56) References Cited

U.S. PATENT DOCUMENTS

| | | | |
|---|---|---|---|
| 6,266,442 B1 * | 7/2001 | Laumeyer et al. | 382/190 |
| 6,560,529 B1 | 5/2003 | Janssen | |
| 7,058,206 B1 * | 6/2006 | Janssen et al. | 382/104 |
| 7,729,850 B1 * | 6/2010 | Kraft et al. | 701/423 |
| 2001/0036293 A1 * | 11/2001 | Laumeyer et al. | 382/104 |
| 2004/0143381 A1 | 7/2004 | Regensburger et al. | |
| 2006/0212216 A1 * | 9/2006 | Kobayashi et al. | 701/207 |
| 2007/0109111 A1 | 5/2007 | Breed et al. | |
| 2009/0109216 A1 * | 4/2009 | Uetabira | 345/419 |

(Continued)

FOREIGN PATENT DOCUMENTS

| | | |
|---|---|---|
| AU | 755096 B2 | 12/2002 |
| EP | 0 738 946 A1 | 10/1996 |

(Continued)

OTHER PUBLICATIONS

Fang et al., "An automatic road sign recognition system based on a computational model of human recognition processing", "Computer Vision and Image Understanding, vol. 96, Issue 2, Nov. 2004, pp. 237-268", Available online Aug. 3, 2004.*

(Continued)

*Primary Examiner* — Bhavesh Mehta
*Assistant Examiner* — Tahmina Ansari
(74) *Attorney, Agent, or Firm* — Oliff & Berridge, PLC

(57) ABSTRACT

A feature information collecting device includes: a feature image recognizing unit that performs image recognition processing of a feature included in image information in a surrounding area of a vehicle; a construction information obtaining unit that obtains construction information including information of a construction section; a construction information storage unit that stores the obtained construction information; a construction completion determining unit that determines, when the vehicle travels a section of a road corresponding to a construction section according to the already stored construction information, completion of construction indicated by the construction information; and a feature learning unit that causes the feature image recognizing unit to perform image recognition processing of a feature in a construction section according to the construction information when the completion of construction is determined, and that generates, based on an image recognition result thereof and the vehicle position information, learned feature information including position information and attribute information of an image-recognized feature.

16 Claims, 8 Drawing Sheets

U.S. PATENT DOCUMENTS

| | | | |
|---|---|---|---|
| 2009/0169055 A1* | 7/2009 | Ishikawa | 382/104 |
| 2009/0177379 A1* | 7/2009 | Jones | 701/207 |
| 2010/0274469 A1* | 10/2010 | Takahata et al. | 701/200 |

FOREIGN PATENT DOCUMENTS

| | | | |
|---|---|---|---|
| EP | 0 782 118 A1 | | 7/1997 |
| EP | 0 921 509 A2 | | 6/1999 |
| JP | 2002267457 | * | 9/2002 |
| JP | A-2003-36500 | | 2/2003 |
| JP | A-2006-038558 | | 2/2006 |
| JP | A-2006-275690 | | 10/2006 |
| JP | A-2007-271568 | | 10/2007 |
| WO | WO 2006/080547 A1 | | 8/2006 |
| WO | WO2008108449 | * | 2/2008 |

OTHER PUBLICATIONS

Shishedo et al., Machine Translation of Japanese Patent Publication JP 2002-267457, "Navigation System Method and Program for Displaying Newly Constructed Road", Accessed May 2012, pp. 1-8.*
European Search Report issued in Application No. 08 16 8734 on Jun. 17, 2009.

* cited by examiner

FIG. 8A
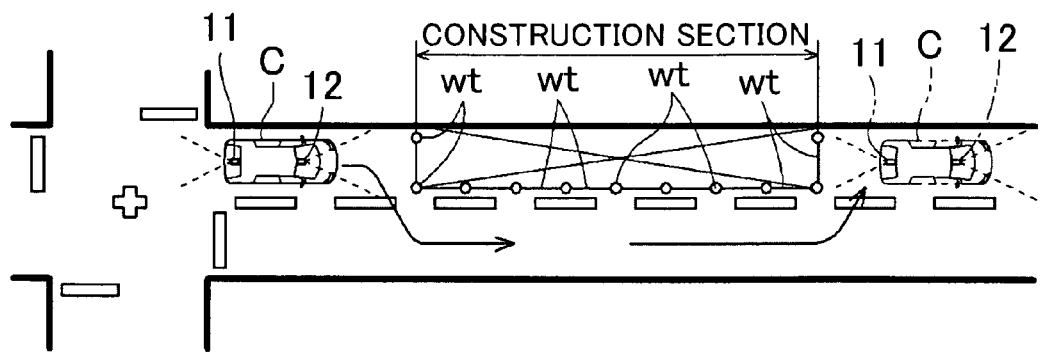
FIG. 8B
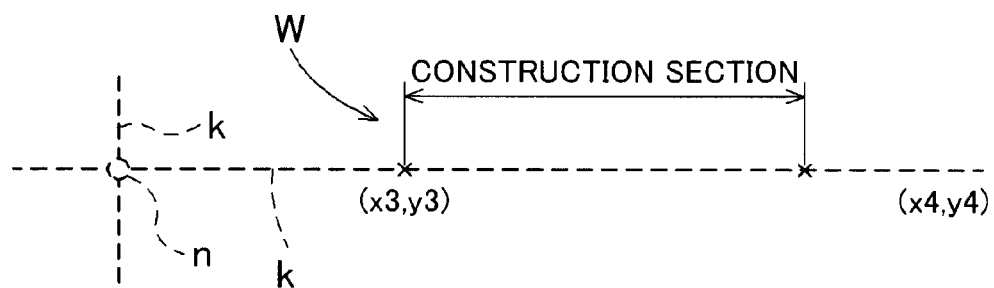
FIG. 9
| OBTAINED DATE AND TIME | CONSTRUCTION SECTION | RECOGNIZED TYPE | CONSTRUCTION PERIOD |
|---|---|---|---|
| 05/01/2008 | (x1,y1)–(x2,y2) | CONSTRUCTION NOTICE SIGN | 08/01/2008–25/01/2008 |
| 10/01/2008 | (x3,y3)–(x4,y4) | SECURITY LIGHT/CONSTRUCTION BARRICADE | — |
| 13/01/2008 | (x5,y5)–(x6,y6) | CONSTRUCTION INFORMATION RECEIVED | — |
| ⋮ | ⋮ | ⋮ | ⋮ |

IMAGE RECOGNITION PROCESSING DEVICE, METHOD, AND PROGRAM FOR PROCESSING OF IMAGE INFORMATION OBTAINED BY IMAGING THE SURROUNDING AREA OF A VEHICLE

INCORPORATION BY REFERENCE

The disclosure of Japanese Patent Application No. 2007-337454 filed on Dec. 27, 2007 including the specification, drawings and abstract is incorporated herein by reference in its entirety.

BACKGROUND OF THE INVENTION

1. Field of the Invention

The present invention relates to a feature information collecting device and a feature information collecting program that recognizes the image of a feature included in image information obtained from an imaging device or the like mounted in a vehicle and collects information of the feature, as well as a vehicle position recognizing device and a navigation device using them.

2. Description of the Related Art

Accompanying improvement in imaging devices and image recognition technologies in recent years, it has become more common to develop a technology for performing image recognition processing of image information obtained by imaging the surrounding area of a vehicle by an on-vehicle camera, and correcting vehicle position information representing the current positing of the vehicle based on surrounding conditions of the vehicle indicated in the image recognition result. For example, the vehicle position recognizing device described in Japanese Patent Application Publication No. JP-A-2007-271568 is structured to perform image recognition processing of a target feature included in image information obtained by an imaging device mounted in a vehicle, and check the image recognition result with feature information of this target feature stored in advance in a database to thereby correct the vehicle position information obtained by a GPS signal or autonomous navigation. Thus, highly precise vehicle position information can be obtained.

Incidentally, for correcting vehicle position information by such a vehicle position recognizing device, it is necessary to prepare a highly accurate database of feature information. To collect such feature information, there is a known device which collects feature information based on an image recognition result of a feature included in image information of the surrounding area of a vehicle obtained from an imaging device or the like mounted in the vehicle (for example, refer to Japanese Patent Application Publication No. JP-A-2006-038558 and Japanese Patent Application Publication No. JP-A-2006-275690). Incidentally, all of the devices described in Japanese Patent Application Publication No. JP-A-2007-271568, Japanese Patent Application Publication No. JP-A-2006-038558 and Japanese Patent Application Publication No. JP-A-2006-275690 take a traffic sign or a road traffic information display board provided on a road as a target feature. Then, these devices perform image recognition of a target feature included in image information obtained by an imaging device mounted in the vehicle, and associate feature information such as sign information extracted from the recognition result thereof with position information and/or section information and store them in a map database. At this time, the position information and/or section information associated with the feature information is determined based on information from a GPS receiver, a gyro, a vehicle speed sensor and the like used generally in navigation devices. Thus, a database of feature information is created in these devices, and a route search, driving support, and the like based on the database is possible.

SUMMARY OF THE INVENTION

In the vehicle position recognizing device described in Japanese Patent Application Publication No. JP-A-2007-271568, with reference to position information of a feature included in feature information which is prepared in advance and stored in a database, vehicle position information can be corrected using a positional relationship between the vehicle and this feature based on an image recognition result of the feature. Thus, the device has an advantage that the vehicle position can be identified with very high accuracy. However, since the feature information stored in the database is used as the reference in the vehicle position recognizing device, when the position of an actual feature is moved to a position different from a position indicated by the feature information due to road construction or the like, there is a possibility that an error of the vehicle position will increase due to correction of the vehicle position information.

Thus, when road construction or the like takes place, it becomes necessary to modify the feature information stored in the database. However, the interval of updating the database in a navigation device is normally every year, and thus it is difficult to respond quickly to modification of feature information accompanied by road construction or the like. Accordingly, it is conceivable to collect feature information and reflect it in the database based on an image recognition result of a feature included in image information of the surrounding area of the vehicle obtained from an imaging device or the like mounted in the vehicle. However, no technology has been existed to collect feature information for the purpose of modifying feature information in the case where the position of the feature is moved due to road construction or the like, the type of the feature is changed, or the like.

The present invention is made in view of the above-described problems, and it is an object thereof to provide a feature information collecting device and a feature information collecting program capable of quickly collecting, even in a case where the position of a feature is moved, or the type of a feature is changed due to construction, feature information after the construction, as well as a vehicle position recognizing device and a navigation device using them.

To achieve the above object, a feature information collecting device according to the present invention has a characteristic structure that includes: a vehicle position information obtaining unit that obtains vehicle position information representing a current position of a vehicle; an image information obtaining unit that obtains image information in a surrounding area of the vehicle; a feature image recognizing unit that performs image recognition processing of a feature included in the image information; a construction information obtaining unit that obtains construction information including information of a construction section; a construction information storage unit that stores the construction information obtained by the construction information obtaining unit; a construction completion determining unit that determines, when the vehicle travels a section of a road corresponding to a construction section according to the construction information already stored in the construction information storage unit, completion of construction indicated by the construction information; and a feature learning unit that causes the feature image recognizing unit to perform image recognition processing of a feature in a construction section according to the construction information when the completion of construction is determined by the construction completion determining unit, and that generates, based on an image recognition result thereof and the vehicle position information, learned feature information including position information and attribute information of an image-recognized feature.

With this characteristic structure, obtained construction information is stored in the construction information storage unit, and when a vehicle travels a section of a road corresponding to a construction section according to the stored existing construction information, completion of construction is determined. When the construction is completed, the position and the attribute of a feature are learned based on an image recognition result of the feature and vehicle position information to generate learned feature information. Accordingly, a section in which construction is performed in the past can be recognized appropriately, and learning of a feature can be performed targeting this section. Therefore, even in a case where the position of a feature is moved, or the type of a feature is change due to construction, feature information after the construction can be collected quickly.

Here, in another preferable structure, the construction information obtaining unit includes a construction information receiving unit that receives the construction information from a transmitter disposed outside of the vehicle.

With this structure, when construction information is transmitted from a transmitter disposed outside of the vehicle, this information can be received and construction information can be obtained appropriately.

Further, in another preferable structure, the construction information obtaining unit includes a construction image recognizing unit that performs image recognition processing of a construction symbol included in the image information obtained by the image information obtaining unit, and a construction information generating unit that generates the construction information based on an image recognition result of a construction symbol by the construction image recognizing unit.

With this structure, construction information can be obtained appropriately based on image information of the surrounding area of the vehicle obtained by the image information obtaining unit.

Here, in another preferable structure, the construction image recognizing unit performs image recognition processing of at least one of a construction notice sign, a construction fence, a construction barricade, a security light, a cone, and a construction guide human model as the construction symbol.

With this structure, a construction symbol disposed with high probability at a site where construction is carried out can be taken as a target for image recognition processing, and thus the possibility of appropriately obtaining construction information can be increased.

Further, in another preferable structure, the construction information generating unit sets a predetermined section with reference to a recognition position of the construction symbol as information of the construction section included in the construction information.

With this structure, information of a construction section can be obtained appropriately regardless of whether or not a construction section can be identified from an image recognition result of a construction symbol.

Further, in another preferable structure, when construction symbols are included in image information of a plurality of consecutive frames, the construction information generating unit sets a start point of the construction section with reference to a recognition position of a first construction symbol included in image information of a front side of the vehicle, and sets an end point of the construction section with reference to a recognition position of a last construction symbol included in image information of a rear side of the vehicle.

With this structure, when a construction symbol is included in image information of a plurality of consecutive frames, it is possible to appropriately set a start point and an end point of a construction section based on an image recognition result for image information of a front side and a rear side of the vehicle, and obtain information of the construction.

Further, in another preferable structure, when a construction notice sign is image-recognized as the construction symbol by the construction image recognizing unit and a construction section is recognized based on an image recognition result of the construction notice sign, the construction information generating unit sets information of a construction section included in the construction information according to a recognition result of the construction section.

With this structure, when the construction symbol is a construction notice sign, and a construction section can be identified based on an image recognition result thereof, it is possible to obtain information of the construction section appropriately.

Further, in another preferable structure, when the vehicle travels a section of a road corresponding to a construction section according to the construction information already stored in the construction information storage unit, the construction completion determining unit determines that construction indicated by the construction information is completed when construction information including a same construction section is not obtained by the construction information obtaining unit.

With this structure, using an obtaining state of construction information by the construction information obtaining unit, it becomes possible to appropriately determine completion of construction according to existing construction information stored in the construction information storage unit.

Further, in another preferable structure, when the construction information includes information of a construction period, the construction completion determining unit determines that construction indicated by the construction information is completed if the construction period according to the construction information is over when the vehicle travels a section of a road corresponding to a construction section according to the construction information already stored in the construction information storage unit.

With this structure, based on information of a construction period included in the construction information, it becomes possible to appropriately determine completion of construction according to existing construction information stored in the construction information storage unit.

Further, in another preferable structure, when the vehicle does not travel a section of a road corresponding to a construction section according to the construction information already stored in the construction information storage unit for a predetermined time period, the construction information is deleted from the construction information storage unit.

With this structure, it is possible to prevent that the construction information stored in the construction information storage unit remains without being deleted while completion determination is not performed by the construction completion determining unit. Thus, it is possible to suppress the amount of construction information stored in the construction information storage unit from becoming excessively large.

Further, in another preferable structure, the feature learning unit includes: a recognition result storage unit that stores recognition position information, which represents a recognition position of a feature by the feature image recognition unit and is obtained based on the vehicle position information, and attribute information of the feature in an associated manner; an estimated position determining unit that determines, based on a plurality of the recognition position information for a same feature, which are stored in the recognition result storage unit due to the same feature being image-recognized a plurality of times, an estimated position of the feature; and a learned feature information generating unit that generates learned feature information by associating position information representing an estimated position of each feature determined by the estimated position determining unit with attribute information of the feature.

With this structure, based on a plurality of recognition position information for the same feature, which are stored in the recognition result storage unit due to the same feature being image-recognized a plurality of times, an estimated position of this feature is determined, and learned feature information having the estimated position as position information is generated. Therefore, even when errors are included in recognition positions of a target feature indicated by respective recognition position information, the errors can be averaged by determining the estimated position using a plurality of recognition position information, and hence accuracy of position information of a feature included in the learned feature information can be increased.

Further, another preferable structure further includes a feature database that stores initial feature information including position information and attribute information which are prepared in advance for a plurality of features, in which the feature learning unit causes the feature image recognizing unit to perform image recognition in the construction section giving priority to a feature of a same type as a feature according to the initial feature information having position information in the construction section.

In general, even when road construction is performed, there is a low possibility that a feature completely different from the feature existed before the construction is provided after the construction. Supposing that the position of the feature is changed, there is a high possibility that a feature of the same type as the feature existed before the construction exists after the construction. With this structure, when causing the feature image recognizing unit to perform image recognition processing of a feature in a construction section according to the construction information already stored in the construction information storage unit, a feature of the same type as the feature existed before the construction can be image-recognized with priority, because there is a high possibility that this feature exists after the construction. Thus, a possibility of succeeding in image recognition of a feature can be increased.

Further, in another preferable structure, the feature learning unit compares an image recognition result of a feature by the feature image recognizing unit with the initial feature information having position information in the construction section and changes a generating condition for the learned feature information according to a degree of approximation therebetween.

With this structure, the generation condition of learned feature information is changed according to the degree of approximation of the position, the type, or the like of a feature before and after construction. Therefore, learning is performed easily when a change amount of the position or the type of a feature before and after construction is small, for example, when the feature is not moved or changed before and after construction, or only the position is moved. Thus, it becomes possible to generate learned feature information quickly.

Further, another preferable structure includes a database that stores the learned feature information.

With this structure, when correction of vehicle position information is performed, the generated learned feature information can be used easily.

A vehicle position recognition device according to the present invention has a characteristic structure that includes: a feature information collecting device having the above structures; and a vehicle position correcting unit that checks an image recognition result of a feature by the feature image recognizing unit with the learned feature information for the feature and corrects the vehicle position information.

With this characteristic structure, by checking an image recognition result of a feature by the feature image recognizing unit with the learned feature information for this feature to correct vehicle position information, it is possible to correct the vehicle position information with reference to position information of a feature included in the learned feature information, and identify the vehicle position with high accuracy. Therefore, even in the case where the position of a feature is moved, or the type of the feature is changed due to construction, the vehicle position information can be corrected using the learned feature information collected after the construction.

The above-described vehicle position recognizing device according to the present invention can be used preferably for a navigation device including a map database in which map information is stored, an application program that operates referring to the map information, and a guidance information output unit that operates according to the application program and outputs guidance information.

A technical characteristic of a feature information collecting device according to the present invention having the above structures is applicable to a feature information collecting method and a feature information collecting program, and thus the present invention can include such a method and program as subjects of right. For example, the feature information collecting program causes a computer to execute: a vehicle position information obtaining function that obtains vehicle position information representing a current position of a vehicle; an image information obtaining function that obtains image information in a surrounding area of the vehicle; a feature image recognizing function that performs image recognition processing of a feature included in the image information; a construction information obtaining function that obtains construction information including information of a construction section; a construction information storage function that stores the construction information obtained by the construction information obtaining unit in a construction information storage unit; a construction completion determining function that determines, when the vehicle travels a section of a road corresponding to a construction section according to the construction information already stored in the construction information storage unit, completion of construction indicated by the construction information; and a feature learning function that performs image recognition processing of a feature in a construction section according to the construction information when the completion of construction is determined by the construction completion determining unit, and that generates, based on an image recognition result thereof and the vehicle position information, learned feature information including position information and attribute information of an image-recognized feature. As a matter of course, such feature information collecting program can obtain the above-described operation and effect related to the feature information collecting device, and can further incorporate the several additional technologies presented as examples of preferable structures thereof.

BRIEF DESCRIPTION OF THE DRAWINGS

FIGS. 8A and 8B are explanatory diagrams illustrating an example of a method of obtaining construction information;

FIG. 9 is a table showing an example of construction information stored in a construction database;

DETAILED DESCRIPTION OF THE PREFERRED EMBODIMENTS

Figure 1:
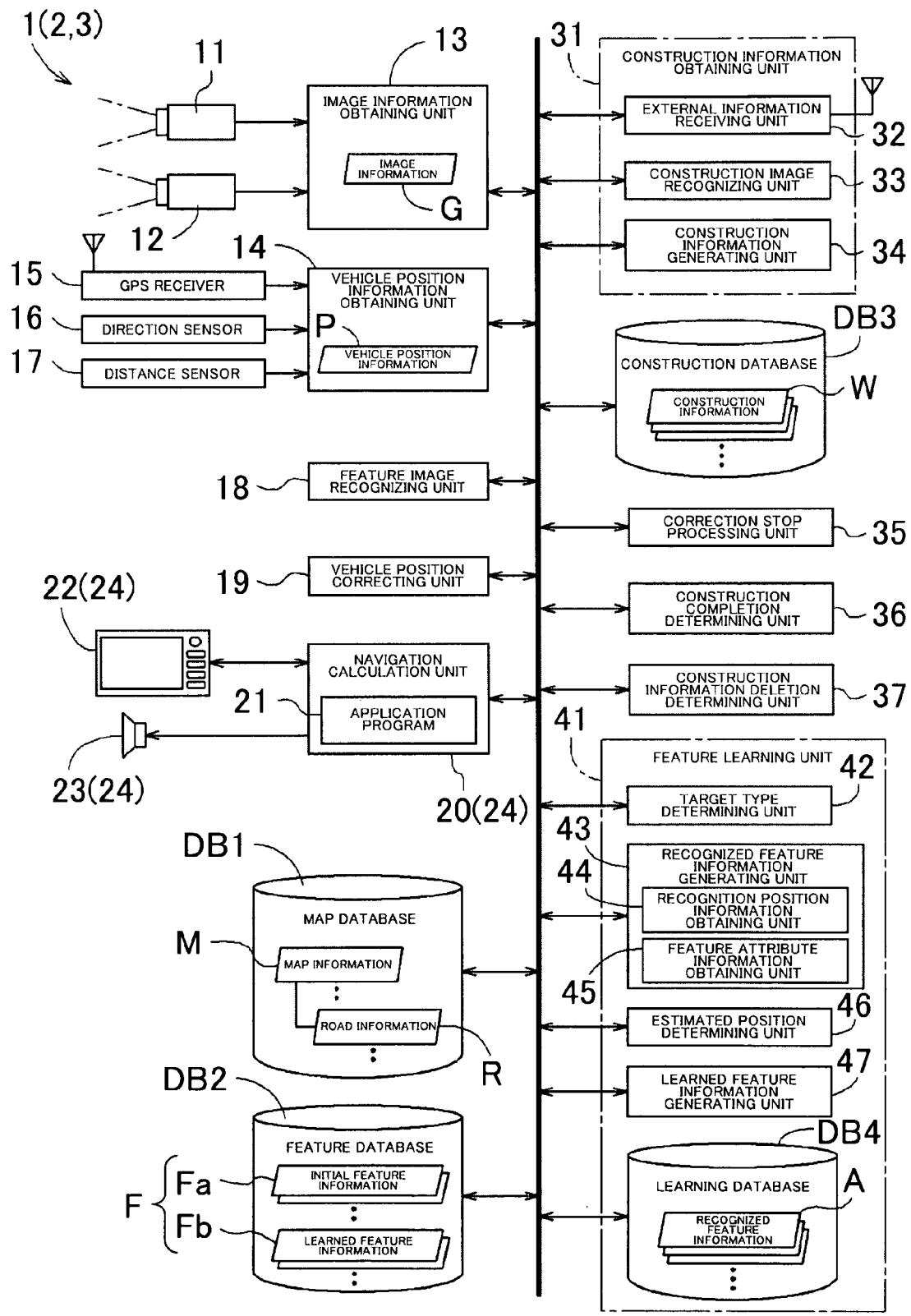
FIG. 1 is a block diagram showing a schematic structure of a navigation device according to an embodiment of the present invention.
Figure 2:
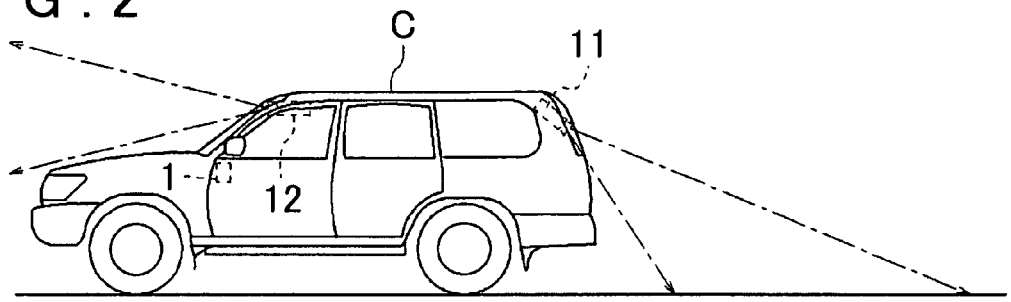
FIG. 2 is a diagram showing a vehicle in which the navigation device is mounted.

Next, an embodiment of the present invention will be explained based on the drawings. FIG. 1 is a block diagram showing a schematic structure of a navigation device 1 according to this embodiment. FIG. 2 is a diagram showing a vehicle C in which this navigation device 1 is mounted. This navigation device 1 is for being mounted in a vehicle, and includes a vehicle position recognizing device 2 and a feature information collecting device 3 according to the present invention. This navigation device 1 obtains image information G of the surrounding area of the vehicle C to image recognize a feature such as a road marking (painting or the like), and checks the image recognition result thereof with feature information F about the feature stored in a feature database DB2 to correct vehicle position information P. Accordingly, the navigation device 1 can obtain highly precise vehicle position information P, and provide guidance more appropriately. However, when traveling on a road where construction is performed, there may be a case that the vehicle C has to travel on an opposite lane, a case that a feature such as a road marking is moved or rewritten, or the like. Thus, it often happens that correction of the vehicle position information P cannot be performed appropriately. Accordingly, the navigation device 1 has a function to stop, when construction information W is obtained, correction of the vehicle position information P within a construction section thereof. When performing correction of the vehicle position information P and stopping the correction in this manner, the navigation device 1 functions as the vehicle position recognizing device 2.

Further, this navigation device 1 is arranged to store the obtained construction information W in a construction database DB3. Then, if the construction has been completed when the vehicle C travels on the section of a road corresponding to the construction section according to the already stored construction information W, the device has a function to perform image recognition processing of a feature in the construction section according to the construction information W, and generate, based on the image recognition result thereof and the vehicle position information P, learned feature information Fb as feature information F of the image-recognized feature. Accordingly, a feature such as a road marking that is moved or rewritten due to construction can be learned appropriately, and feature information F of the learned feature can be used for correcting the vehicle position information P. When learning a feature based on the existing construction information W in this manner, the navigation device 1 functions as the feature information collecting device 3.

The navigation device 1 shown in FIG. 1 includes, as functional units, an image information obtaining unit 13, a vehicle position information obtaining unit 14, a feature image recognizing unit 18, a vehicle position correcting unit 19, a navigation calculation unit 20, an external information receiving unit 32, a construction image recognizing unit 33, a construction information generating unit 34, a correction stop processing unit 35, a construction completion determining unit 36, a construction information deletion determining unit 37, a target type determining unit 42, a recognized feature information generating unit 43, an estimated position determining unit 46, and a learned feature information generating unit 47. These functional units are implemented by hardware or software (program) or both of them in order to perform various processing on inputted data, with an arithmetic processing device, such as a CPU, as a core member that is commonly or independently used. Further, these functional units are configured to be able to transfer information to each other.

A map database DB1 includes, for example, a device having a recording medium capable of storing information and a driving unit thereof as a hardware configuration, such as a hard disk drive, a DVD drive having a DVD-ROM, or a CD drive having a CD-ROM. Further, the feature database DB2, the construction database DB3, and a learning database DB4 include, for example, a device having a recording medium capable of storing and rewriting information and a driving unit thereof as a hardware configuration, such as a hard disk drive, a flash memory, or the like. Hereinafter, structures of the units of the navigation device 1 according to this embodiment will be explained in detail.

1. Map Database

Figure 3:
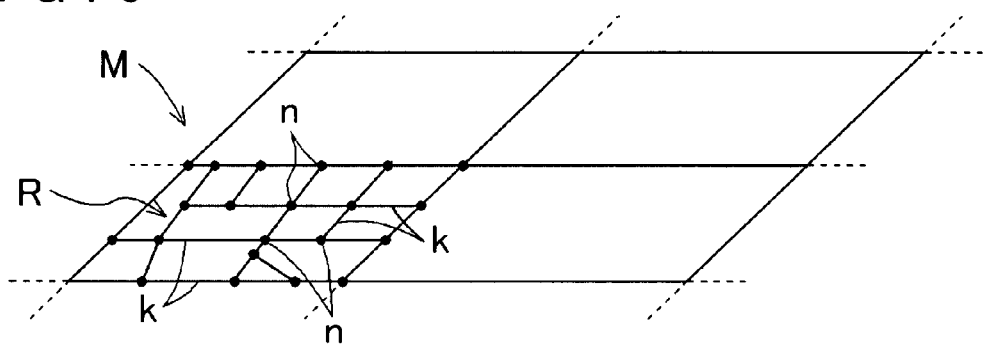
FIG. 3 is a diagram showing an example of a structure of map information stored in a map database.

The map database DB1 is a database that stores map information M divided into predetermined sections. FIG. 3 is a diagram showing an example of a structure of the map information M stored in the map database DB1. As shown in this diagram, the map information M includes road information R representing a road network by a connection relationship of a plurality of links k. The road network is constituted of links k and nodes n each being a connection point of two links k. The node n corresponds to an intersection on an actual road, and the link k corresponds to a road connecting intersections. Each node n has information of a position (coordinates) on a map represented by latitude and longitude. Each link k has information such as load length, road type, road width, number of lanes, and shape interpolation point for representing a link shape, as link attribute information. Here, the road type is information of a road type when roads are categorized into a plurality of types, such as expressway, national highway, prefectural highway, open road, narrow road, and introducing road for example. The node n has information of traffic restriction, presence of a signal, and the like as node attribute information. Note that, in FIG. 3, only the road information R of one section is shown, and road information R for other sections are omitted.

This road information R is used for map matching, route search from a departure point to a destination, route guidance to the destination, and the like, which will be described later. Besides them, the map information M that includes the road information R is used for displaying a map of the surrounding area of the vehicle C, the surrounding area of a destination, and the like, displaying a route to a destination, and the like. Accordingly, the map information M includes, although not shown, drawing information having various information necessary for displaying a map, intersection information constituted of detailed information of intersections, and the like, in addition to the road information R as described above. Further, this drawing information includes background information necessary for displaying road shapes, buildings, rivers, and the like, character information necessary for displaying city, town, and village names as well as road names, and the like.

2. Feature Database

The feature database DB2 is a database that stores information of a plurality of features provided on a road or the surrounding area of a road, namely, feature information F. As shown in FIG. 1, in this embodiment, the feature database DB2 stores two types of information, i.e., initial feature information Fa and learned feature information Fb. Here, the initial feature information Fa is feature information F about a plurality of features prepared and stored in advance in the feature database DB2. On the other hand, the learned feature information Fb is, as will be described later, feature information F generated by the learned feature information generating unit 47 as a result of learning using an image recognition result of a feature by the feature image recognizing unit 18 and stored in the feature database DB2. Note that in the explanation below, when "feature information F" is mentioned simply, it generically refers to these initial feature information Fa and learned feature information Fb. Note that, in this embodiment, the initial feature information Fa and the learned feature information Fb are stored in the same feature database DB2, but they may be stored in separated databases.

Figure 4:
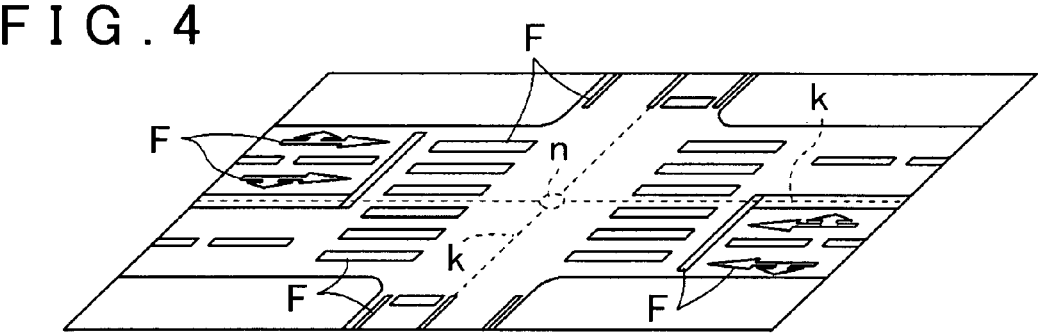
FIG. 4 is a diagram showing an example of feature information of a road marking stored in the feature database.

Features for which feature information F is stored in this feature database DB2 include a road marking (painting) provided on the surface of a road. FIG. 4 is a diagram showing an example of the feature information F of a road marking stored in the feature database DB2. Examples of the feature related to such a road marking include a crosswalk, a stop line, a speed marking representing a maximum speed or the like, a zebra zone, a lane marking (including various lane markings such as a solid line, a broken line, a double line, and the like) sectioning each lane along the road, a traffic section marking for each traveling direction (including an arrow marking, for example, a straight-ahead arrow, a right-turn arrow, and the like) specifying a traveling direction of each lane, and the like. In addition to such road markings, examples of the feature whose feature information F is stored can include various features such as a traffic signal, a sign, an overpass, a tunnel, and a manhole.

Further, the feature information F includes, as contents thereof, position information of each feature, and feature attribute information related thereto. Here, the position information includes a position (coordinates) on a map of a representative point of each feature related to a link k, a node n, and the like constituting road information R, and information of the direction of each feature. In this example, the representative point is set in the vicinity of a center portion in a length direction and a width direction of each feature. Further, feature attribute information includes identification information for identifying a feature from other features (feature ID), type information representing a feature type of each feature, feature form information of the shape, size, color, and the like of the feature. Here, the feature type is information representing the type of a feature having basically the same form such as, specifically, "crosswalk", "stop line", or "speed marking (30 km/hour)".

3. Image Information Obtaining Unit

The image information obtaining unit 13 functions as an image information obtaining unit which obtains image information G of the surrounding area of the vehicle C captured by an imaging device. Here, the imaging device is an on-vehicle camera or the like having an imaging element, and is preferable if the imaging device is provided at least at a position where it can image the surface of a road in the surrounding area of the vehicle C. In this embodiment, as the imaging device, as shown in FIG. 2, there are provided a back camera 11 which captures a road surface on a rear side of the vehicle C, and a front camera 12 which captures a road surface and further an upper side of a front side of the vehicle C. In this example, the back camera 11 is provided to capture a lower side (road surface side) than the front camera 12. Therefore, the back camera 11 can capture a road surface closer to the vehicle C than the front camera 12. The image information obtaining unit 13 takes in image information G captured by the back camera 11 and the front camera 12 at predetermined time intervals via a frame memory (not shown). A time interval for taking in the image information G at this time can be about, for example, 10 to 50 ms. Accordingly, the image information obtaining unit 13 can successively obtain image information G of a plurality of frames captured by the back camera 11 and the front camera 12. The image information G obtained here is output to the feature image recognizing unit 18. Note that, in the explanation below, when image information G is simply mentioned, it includes both the image information G captured by the back camera 11 and the image information G captured by the front camera 12.

4. Vehicle Position Information Obtaining Unit

The vehicle position information obtaining unit 14 functions as a vehicle position information obtaining unit which obtains vehicle position information P representing the current position of the vehicle C. Here, the vehicle position information obtaining unit 14 is connected to a GPS receiver 15, a direction sensor 16, and a distance sensor 17. Here, the GPS receiver 15 is a device receiving a GPS signal from a global positioning system (GPS) satellite. This GPS signal is normally received at every second and outputted to the vehicle position information obtaining unit 14. In the vehicle position information obtaining unit 14, the signal from the GPS satellite received by the GPS receiver 15 is analyzed, and thereby information such as the current position (latitude and longitude), the traveling direction, and moving speed of the vehicle C can be obtained. The direction sensor 16 is a sensor that detects the traveling direction or a change in the traveling direction of the vehicle C. This direction sensor 16 is constituted of, for example, a gyro sensor, a geomagnetism sensor, an optical rotation sensor or a rotation-type resistance volume attached to a rotation part of a steering wheel, an angle sensor attached to a wheel part, etc. Then, the direction sensor 16 outputs a detection result thereof to the vehicle position information obtaining unit 14. The distance sensor 17 is a sensor that detects a vehicle speed and a moving distance of the vehicle C. This distance sensor 17 is constituted of, for example, a vehicle speed pulse sensor that outputs a pulse signal every time a drive shaft, a wheel, or the like of the vehicle rotates by a certain amount, a yaw/G sensor that detects acceleration of the vehicle C, a circuit that integrates the detected acceleration, etc. Then, the distance sensor 17 outputs information of vehicle speed and moving distance as detection results thereof to the vehicle position information obtaining unit 14.

Then, the vehicle position information obtaining unit 14 performs calculation for identifying the position of the vehicle C by a known method based on outputs from these GPS receiver 15, direction sensor 16 and distance sensor 17. The vehicle position information P obtained in this manner results in information including errors due to detection accuracies of the sensors 15 to 17. Accordingly, in this embodiment, the vehicle position information obtaining unit 14 obtains road information R of the surrounding area of the vehicle position from the map database DB1, and performs publicly known map matching based on this information, thereby performing correction to match the vehicle position with a link k or a node n included in the road information R. Further, by the vehicle position correcting unit 19 which will be described later, the position of the vehicle C in the traveling direction shown in the vehicle position information P is corrected using the image information G and the feature information F. Accordingly, the vehicle position information obtaining unit 14 obtains highly precise vehicle position information P of the vehicle C.

5. Feature Image Recognizing Unit

The feature image recognizing unit 18 functions as a feature image recognizing unit which performs image recognition processing of a feature included in image information G obtained by the image information obtaining unit 13. In this embodiment, the feature image recognizing unit 18 performs two types of image recognition processing, i.e., image recognition processing for position correction for correcting the vehicle position information P by the vehicle position correcting unit 19 which will be described later, and image recognition processing for feature learning for generating the learned feature information Fb by a feature learning unit 41. That is, the navigation device 1 performs, as will be described later, vehicle position correction processing by the vehicle position correcting unit 19 based on existing construction information W stored in the construction database DB3 and construction information W newly obtained by a construction information obtaining unit 31, or performs feature learning processing by the feature learning unit. Therefore, the feature image recognizing unit 18 performs the image recognition processing for position correction when the navigation device 1 performs vehicle position correction processing, and performs the image recognition processing for feature learning when the navigation device 1 performs feature learning processing. Note that, in this embodiment, the feature image recognizing unit 18 is arranged to perform image recognition processing of a feature, using, as a target, the image information G obtained by the back camera 11 which is capable of capturing a road surface closer to the vehicle C than the front camera 12. In addition, it is also possible of course to perform the image recognition processing of a feature using the image information G obtained by the front camera 12 as a target.

Figure 5:
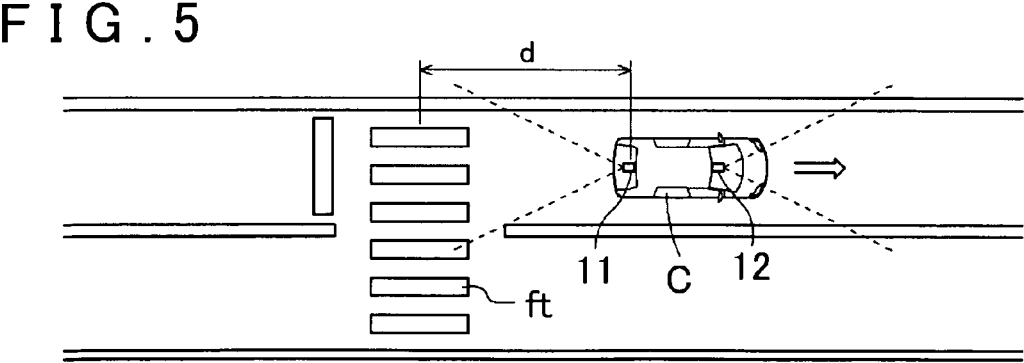
FIG. 5 is a diagram showing an example of a condition of the vehicle when image recognizing a target feature and correcting vehicle position information.

In the image recognition processing for position correction, the feature image recognizing unit 18 obtains feature information F of one, two or more features existing in the surrounding area of the vehicle C from the feature database DB2 based on the vehicle position information P, and performs, with the one, two or more features being a target feature ft (refer to FIG. 5), image recognition processing of the target feature ft included in the image information G. In this embodiment, based on the vehicle position information P and the position information of a feature included in the feature information F, the feature image recognizing unit 18 obtains feature information F of one feature existing in the traveling direction of the vehicle C from the feature database DB2, and sets the feature included in this feature information F as the target feature ft. Next, based on attribute information included in the feature information F for this target feature ft, image recognition processing is executed using a feature of the feature type indicated by this attribute information as a target. In this manner, by narrowing the target feature to a feature of one feature type, it is possible to suppress erroneous recognition and increase the accuracy of image recognition processing. This image recognition processing for position correction is performed based on position information of this target feature ft included in the feature information F and targeting a predetermined recognition section set to the surrounding area of the target feature ft. Then, the image recognition result of the target feature ft by this image recognition processing for position correction is used for correcting the vehicle position information P by the vehicle position correcting unit 19.

In the image recognition processing for feature learning, the feature image recognizing unit 18 performs, using a feature of one, two or more target types determined by the target type determining unit 42 as a target, which will be described later, image recognition processing of a feature of this one, two or more target types included in the image information G. This determination of a target type by the target type determining unit 42 is performed referring to the initial feature information Fa stored in the feature database DB2, and this point will be described later. This image recognition processing for feature learning is performed, as will be described later, based on existing construction information W stored in the construction database DB3 and targeting a construction section according to this construction information W. That is, based on the vehicle position information P, the feature image recognizing unit 18 executes image recognition processing of a feature of the target type included in the image information G while the vehicle C travels the section of a road corresponding to the construction section according to the existing construction information W stored in the construction database DB3. Then, the image recognition result of a feature of this image recognition processing for feature learning is used for obtaining recognition position information and feature attribute information of a feature by the recognized feature information generating unit 43 of the feature learning unit 41.

The feature image recognizing unit 18 performs binarization processing, edge detection processing, and the like on image information G during image recognition of a feature in the image recognition processing for position correction and the image recognition processing for feature learning, and extracts contour information of a feature (road marking) included in this image information G. Thereafter, the feature image recognizing unit 18 performs pattern matching of the extracted contour information of the feature with the characteristic amount of the form of the target feature or a feature of the target type. Then, if the pattern matching has succeeded, it is determined that image recognition of this feature has succeeded, and the image recognition result thereof is outputted. The output destination of this image recognition result is the vehicle position correcting unit 19 in the case of the image recognition processing for position correction, and the recognized feature information generating unit 43 in the case of the image recognition processing for feature learning. On the other hand, when pattern matching has not succeeded in a section where image recognition processing of this feature is performed, that is, the recognition section in the case of the image recognition processing for position correction or the construction section in the case of the image recognition processing for feature learning, it is determined that the image recognition of this feature is failed. In this case, information indicating that the image recognition is failed is outputted to the vehicle position correcting unit 19 or the recognized feature information generating unit 43.

6. Vehicle Position Correcting Unit

The vehicle position correcting unit 19 functions as a vehicle position correcting unit which checks an image recognition result of a feature by the feature image recognizing unit 18 with the feature information F of this feature so as to correct the vehicle position information P. In this embodiment, the vehicle position correcting unit 19 corrects the vehicle position information P in the traveling direction of the vehicle C along a link k of the road information R. Specifically, based on an image recognition result of a target feature ft by the image recognition processing for position correction of the feature image recognizing unit 18, and an attaching position, an attaching angle, an angle of view, and the like of the back camera 11 as an imaging device, the vehicle position correcting unit 19 first calculates a positional relationship between the vehicle C and the target feature ft at the time of obtaining the image information G including an image of the target feature ft. For example, when the image information G is obtained in the situation shown in FIG. 5, the vehicle position correcting unit 19 calculates a positional relationship (for example, a distance d) between the vehicle C and a crosswalk as the target feature ft based on the image recognition result of the image information G. Next, based on the calculation result of this positional relationship between the vehicle C and the target feature ft and the position information of the target feature ft included in feature information F obtained from the feature database DB2, the vehicle position correcting unit 19 calculates and obtains highly precise position information of the vehicle C with reference to the position information (feature information F) of the target feature ft in the traveling direction of the vehicle C. Then, based on the highly precise position information of the vehicle C obtained in this manner, the vehicle position correcting unit 19 corrects information of the current position in the traveling direction of the vehicle C included in the vehicle position information P obtained by the vehicle position information obtaining unit 14. As a result, the vehicle position information obtaining unit 14 obtains highly precise vehicle position information P after being corrected.

7. Navigation Calculation Unit

The navigation calculation unit 20 is a calculation processing unit that operates in accordance with an application program 21 for executing a navigation function such as vehicle position display, route search from a departure point to a destination, route guidance to the destination, destination search, and the like. Here, referring to the vehicle position information P, the map information M including the road information R, the feature information F etc., the application program 21 causes the navigation calculation unit 20 to execute various navigation functions. For example, the navigation calculation unit 20 obtains the map information M of the surrounding area of the vehicle C from the map database DB1 based on the vehicle position information P so as to display an image of the map on the display screen of a display input device 22, and performs processing of displaying a vehicle position mark to overlap on the image of this map based on the vehicle position information P. Further, the navigation calculation unit 20 performs route search from a predetermined departure point to a destination based on the map information M stored in the map database DB1. Moreover, the navigation calculation unit 20 performs route guidance for the driver using one or both of the display input device 22 and an audio output device 23 based on the searched route from the departure point to the destination and the vehicle position information P. When executing these navigation functions, the navigation calculation unit 20 can perform more appropriate guidance since the highly precise vehicle position information P can be obtained by the vehicle position correcting unit 19 as described above. Note that, in the display input device 22, a display device such as a liquid crystal display device, and an input device such as a touch panel or an operation switch are integrated. The audio output device 23 includes a speaker and the like. In this embodiment, the navigation calculation unit 20, the display input device 22, and the audio output device 23 function as a guidance information output unit 24 in the present invention.

8. External Information Receiving Unit

The external information receiving unit 32 functions as a construction information receiving unit which receives construction information W from a transmitter disposed outside of the vehicle C. In this embodiment, the external information receiving unit 32 is constituted of a device that receives vehicle information and communication system (VICS) information. Therefore, examples of the transmitter disposed outside of the vehicle C include a radio wave beacon transmitter, an optical beacon transmitter, an FM multiplexed broadcast transmitter, and the like, which constitute the VICS. As already known, road traffic information supplied from the VICS includes construction information W about the road on which the vehicle C is traveling and roads in the surrounding area. This construction information W includes information of a construction section of the construction. Then, upon reception of construction information W from these transmitters, the external information receiving unit 32 outputs this construction information W to the correction stop processing unit 35, which will be described later. Further, the external information receiving unit 32 stores the received construction information W in the construction database DB3. The construction information W received by this external information receiving unit 32 is stored in the third row in the construction database DB3 in the example shown in FIG. 9. In addition, the external information receiving unit 32 may be a device that receives road traffic information and construction information from other than the VICS. Specifically, it is also preferable that the external information receiving unit 32 is constituted of a device that receives information from a system that distributes road traffic information, construction information, and the like to the navigation device 1 or the like using various wireless communication networks, for example, a cellular phone network. Further, the area of receiving the construction information W is not limited to the road on which the vehicle C is traveling or other roads in the surrounding area, and it is also preferable that the device is structured to receive all the construction information W of the region in which the vehicle C exists or in the country for example.

9. Construction Image Recognizing Unit

The construction image recognizing unit 33 functions as a construction image recognizing unit which performs image recognition processing of a construction symbol wt (refer to FIG. 7) included in image information G obtained by the image information obtaining unit 13. Here, the construction symbol wt is one of various objects provided in a site where road construction is performed, and is preferable if it is an object having a characteristic form that can be image recognized easily. Examples of such a construction symbol wt include a construction notice sign, a construction fence, a construction barricade, a security light, a cone, a construction guide human model (for example, a human model imitating a security guard), and the like, and the construction image recognizing unit 33 takes at least one of them as a target of image recognition processing. The construction notice sign, the construction fence, the construction barricade, and the like are preferable when image recognition processing is performed thereon taking a pattern such as oblique lines of yellow and black, a typical outline and/or the like, which are frequently used for them, as a characteristic amount. Further, the security light, the cone, the construction guide human model, or the like often has a characteristic outline, and thus it is preferable to use the outline as a characteristic amount for performing image recognition processing. In this embodiment, the construction image recognizing unit 33 performs image recognition processing of the construction symbol wt, using the image information G obtained by both of the back camera 11 and the front camera 12 as a target.

When image recognizing a construction symbol wt, the construction image recognizing unit 33 performs binarization processing, edge detection processing, and/or the like on image information G, and extracts contour information of the construction symbol wt included in this image information G. Thereafter, the construction image recognizing unit 33 performs pattern matching of the extracted contour information of the construction symbol wt with characteristic amounts of the forms of a plurality of types of construction symbols wt prepared in advance. Then, if the pattern matching has succeeded with the characteristic amount of the form of one of the construction symbols wt, it is determined that this construction symbol wt is image-recognized, and the image recognition result thereof is outputted to the construction information generating unit 34. The construction image recognizing unit 33 executes such image recognition processing of a construction symbol wt for all image information G or image information G at a predetermined interval obtained by both of the back camera 11 and the front camera 12. Further, when a construction notice sign is image-recognized as a construction symbol wt, the construction image recognizing unit 33 executes image recognition processing of characters included in this construction notice sign. Accordingly, information of a construction section, a construction period, and the like described on the construction notice sign can be obtained. Note that, since numerous known technologies already exist for a specific method of image recognition processing of characters, explanation thereof is omitted here. The thus obtained information of the type of the construction symbol wt for which image recognition has succeeded, and the information of the recognition result of the characters in a case where the construction symbol wt is a construction notice sign are outputted to the construction information generating unit 34 as image recognition results by the construction image recognizing unit 33.

Figure 6A:
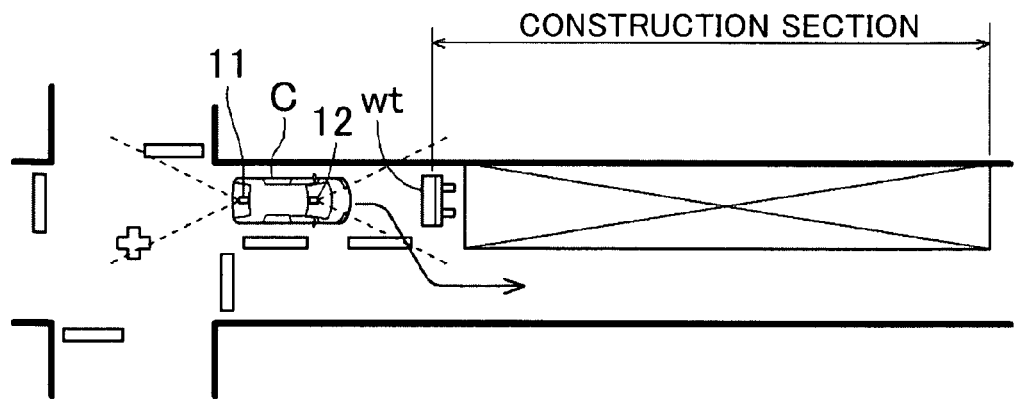
FIGS. 6A and 6B are explanatory diagrams illustrating examples of an obtaining method of construction information.
Figure 6B:
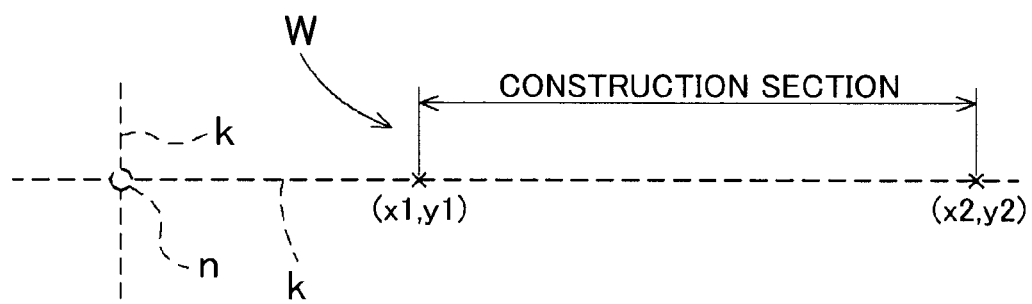
Figure 7:
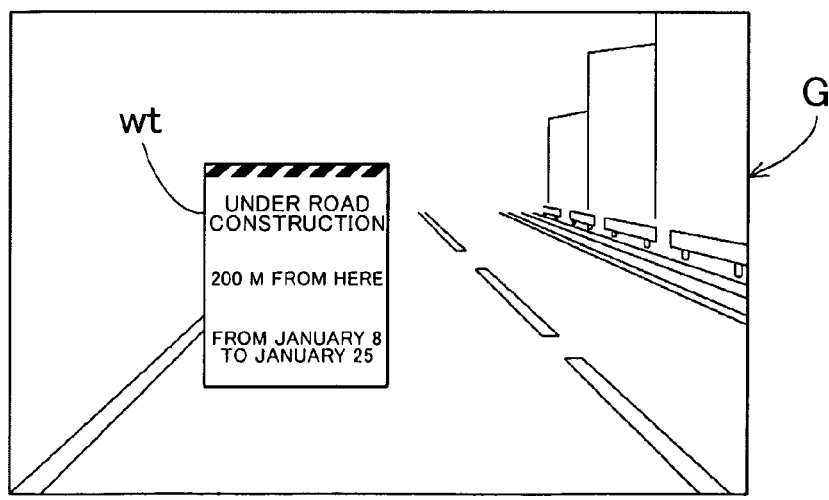
FIG. 7 is a diagram showing an example of image information including the construction notice sign as a construction symbol in an imaging area.

FIGS. 6A and 6B are explanatory diagrams illustrating examples of an obtaining method of construction information W. FIG. 6A shows an example of a road condition when construction is performed on the road on which the vehicle C is traveling, and FIG. 6B shows contents of the construction information W obtained in the road condition shown in FIG. 6A. In the condition shown in FIG. 6A, a construction notice sign is disposed as a construction symbol wt ahead of the vehicle C, and construction to dig up the road is performed for a predetermined distance behind the construction notice sign. FIG. 7 shows an example of image information G including the construction notice sign as a construction symbol wt in an imaging area. This diagram corresponds to image information G obtained by the front camera 12 of the vehicle C at a position shown in FIG. 6A. The construction notice sign shown in the example of FIG. 7 includes thereon, besides character information "under road construction", character information "200 m from here" indicating a construction section, and character information "from January 8 to January 25" indicating a construction period. Therefore, the construction image recognizing unit 33, when it performed image recognition processing using the image information G shown in FIG. 7 as a target, recognizes the image of the construction notice sign as a construction symbol wt and executes character image recognition to obtain the information of the construction section and the construction period. These pieces of information are outputted as image recognition results to the construction information generating unit 34

FIGS. 8A and 8B are, similarly to FIGS. 6A and 6B, explanatory diagrams illustrating examples of an obtaining method of construction information W. However, in the condition shown in these diagrams, a plurality of security lights and construction barricades are disposed alternately as construction symbols wt ahead of the vehicle C, and road construction is performed in the area surrounded by them. In such a condition, the construction image recognizing unit 33 recognizes the images of the security lights and the construction barricades as construction symbols wt included in image information G obtained first by the front camera 12, and then recognizes the images of these construction symbols wt included in both image information G obtained by the front camera 12 and the back camera 11 respectively. Thereafter, the construction image recognizing unit 33 does not recognize any image of the construction symbol wt in the image information G obtained by the front camera 12, and finally does not recognize any image of the construction symbol wt in both the image information G obtained by the front camera 12 and the back camera 11 respectively. Image recognition results of the image information G obtained by these front camera 12 and back camera 11 respectively are outputted to the construction information generating unit 34.

10. Construction Information Generating Unit

The construction information generating unit 34 functions as a construction information generating unit which generates construction information W based on an image recognition result of a construction symbol wt by the construction image recognizing unit 33. The construction information W includes at least information of a construction section, and includes information of a construction period in some cases. FIG. 9 is a diagram showing an example of construction information W stored in the construction database DB3. As shown in this diagram, in this embodiment, the construction information W includes information of an obtained date and time and recognized type besides a construction section and a construction period. Here, the obtained date and time indicates date and time of obtaining construction information W, and the recognized type indicates the type of the construction symbol wt that is image-recognized by the construction image recognizing unit 33. Incidentally, the recognized type is not limited to one, and information of a plurality of recognized types can be included in the construction information W as shown in FIG. 9. That is, there are many cases where a plurality of construction symbols wt are image-recognized in the same construction section, and in such cases, types of the plurality of construction symbols wt are included in the construction information W as information of recognized types. Further, in the example of FIG. 9, the recognized type being "construction information received" represents construction information W received by the external information receiving unit 32. The construction information generating unit 34 generates the construction information W based on the image recognition result of a construction symbol wt by the construction image recognizing unit 33. Then, the construction information generating unit 34, when it generated construction information W, transmits this construction information W to the correction stop processing unit 35, which will be described later. Further, the construction information generating unit 34 stores the generated construction information W in the construction database DB3. In this embodiment, this construction database DB3 corresponds to a construction information storage unit in the present invention.

Next, a specific method of generating construction information W by the construction information generating unit 34 will be explained. When a construction symbol wt of a construction notice sign as shown in FIG. 7 is image-recognized by the construction image recognizing unit 33, the construction information generating unit 34 receives, together with information about that the construction notice sign is image-recognized as a construction symbol wt as described above, information of a construction section "200 m from here" and information of a construction period "from January 8 to January 25" as image recognition results from the construction image recognizing unit 33. In this case, the construction information generating unit 34 sets information of the construction section included in the construction information W according to the information of the construction section as an image recognition result. That is, the construction information generating unit 34 uses the vehicle position information P and the road information R at the time of receiving this image recognition result so as to derive coordinates of a start point (x1, y1) and an end point (x2, y2) of a construction section located on a link k as shown in FIG. 6B, and takes the coordinate information "(x1, y1) to (x2, y2)" thereof as information of a construction section as construction information W. At this time, based on the image recognition result of the construction notice sign, a positional relationship between the vehicle C and the construction notice sign is calculated, and the position of the construction notice sign is taken as the start point of the construction section. In addition, it is also preferable that a position indicated by the vehicle position information P at the time of receiving this image recognition result is taken as the start point of the construction section. On the other hand, as the end point of the construction section, there is taken a point at a distance (here 200 m), which is indicated by the information of construction section as an image recognition result, forward of the vehicle C in the traveling direction along the link k from the start point of the construction section.

Further, the construction information generating unit 34 generates information of a construction period as construction information W based on the date and time of receiving this image recognition result and information of a construction period as the image recognition result. In this example, the information of the image recognition result "from January 8 to January 25" is complemented by the information of the year at the time receiving this image recognition result, thereby providing "01/08/2008 to 01/25/08" as information of a construction period as construction information W. Further, the construction information generating unit 34 generates information of obtained date and time as construction information W from information of date and time which the navigation device 1 has at the time of receiving this image recognition result. Further, the construction information generating unit 34 generates information of a recognized type as construction information W from information of the type of a construction symbol wt for which image recognition is succeeded included in the information of the image recognition result. The construction information W generated as above is stored in the first row of the construction database DB3 in the example shown in FIG. 9.

On the other hand, when the construction image recognizing unit 33 recognizes the image of the construction notice sign which has no information of a construction section, a construction period and the like, or from which they cannot be image-recognized, or when any other construction symbol wt such as a construction fence, a construction barricade, a security light, a cone, a construction guide human model, or the like is image-recognized, the construction information generating unit 34 generates construction information W by a method partially different from the above. For example, when a construction symbol wt which is disposed alone, such as a construction notice sign, a security light, or a construction guide human model is image-recognized, the construction information generating unit 34 sets a predetermined section with reference to the recognition position of this construction symbol wt as information of a construction section included in construction information W. In this case, it is preferable that the predetermined section is set to, for example, a predetermined distance forward in the traveling direction of the vehicle C along a link k from the disposed position of the construction symbol wt or a predetermined distance forward and backward in the traveling direction of the vehicle C along the link k from the disposed position of the construction symbol wt. Here the predetermined distance may be a fixed value or a variable value to be changed based on various information shown in an image recognition result of the construction symbol wt. Also in this example, the information of the obtained date and time and the recognized type can be generated similarly to the above example in which the image of the construction notice sign as shown in FIG. 7 is recognized. On the other hand, in this example, the information on the construction period is not generated, and the construction information W does not include information on the construction period.

Further, as shown in FIGS. 8A and 8B for example, when construction symbols wt disposed to surround a road construction site, such as a construction fence, a construction barricade, a cone, and a plurality of security lights are image-recognized, the construction symbols wt are included in image information G of a plurality of consecutive frames. In this case, the construction information generating unit 34 combines an image recognition result of image information G of a front side of the vehicle C obtained by the front camera 12 by the construction image recognizing unit 33 and an image recognition result of image information G of a rear side of the vehicle C obtained by the back camera 11 to generate information of the construction section. That is, the construction information generating unit 34 sets the start point of the construction section with reference to the recognition position of the first construction symbol wt included in the image information G of the front side of the vehicle C, and sets the end point of the construction section with reference to the recognition position of the last construction symbol wt included in the image information G of the rear side of the vehicle C. Specifically, the construction information generating unit 34 first sets the start point of the construction section based on an image recognition result of a construction symbol wt for image information G of a construction symbol wt first captured by the front camera 12 and vehicle position information P at the time of receiving this image recognition result from the construction image recognizing unit 33. Thereafter, the construction information generating unit 34 sets the end point of the construction section based on an image recognition result of a construction symbol wt for image information G of a construction symbol wt last captured by the back camera 11 and vehicle position information P at the time of receiving this image recognition result from the construction image recognizing unit 33. Here, the first and last construction symbols are, for example, the first captured construction symbol wt and the last captured construction symbol wt in a case where a plurality of construction symbols wt disposed to surround the road construction site are captured across image information G of a plurality of consecutive frames by the front camera 12 or the back camera 11. At this time, it is preferable that the positional relationship between the vehicle C and a construction symbol wt is calculated based on the respective image recognition results, and the position of the construction symbol wt is taken as the start or end point of the construction section, or the position indicated by the vehicle position information P at the time of receiving the respective image recognition results is taken as the start or end point of the construction section. Also in this example, information of the obtained date and time and the recognized type can be generated similarly to the example in which the image of the construction notice sign as shown in FIG. 7 above is recognized. On the other hand, in this example, information of the construction period is not generated, and the construction information W does not include information of the construction period. The construction information W generated as described above is stored in the second row in the construction database DB3 in the example shown in FIG. 9.

Further, for example, in the case where only one of the front camera 12 and the back camera 11 is used for image recognition processing of a construction symbol wt (refer to FIG. 7) and construction symbols wt are included in the image information G of a plurality of consecutive frames obtained by this one of the imaging devices 12, 11, information of the construction section is generated based on the image recognition results thereof. This case is also basically similar to the example according to FIGS. 8A and 8B, where the construction information generating unit 34 sets the start point of the construction section with reference to the recognition position of the first construction symbol wt included in the obtained image information Q and sets the end point of the construction section with reference to the recognition position of the last construction symbol wt included in the image information G. Also in this case, it is preferable that the positional relationship between the vehicle C and the construction symbol wt is calculated based on the respective image recognition results, and the position of the construction symbol wt is taken as the start or end point of a construction section, or the position indicated by the vehicle position information P at the time of receiving the respective image recognition results is taken as the start or end point of the construction section.

As described above, the construction information W including information of the construction section for the road on which the vehicle C is traveling is obtained by the external information receiving unit 32 or by the construction image recognizing unit 33 and the construction information generating unit 34. Therefore, in this embodiment, the external information receiving unit 32, the construction image recognizing unit 33, and the construction information generating unit 34 correspond to the construction information obtaining unit 31 in the present invention.

11. Correction Stop Processing Unit

The correction stop processing unit 35 functions as a correction stop unit which stops correction of vehicle position information P by the vehicle position correcting unit 19 in a construction section based on construction information W. That is, when the correction stop processing unit 35 has obtained construction information W by the construction information obtaining unit 31, the correction stop processing unit 35 stops, based on information of a construction section included in this construction information W and vehicle position information P, processing of the vehicle position correcting unit 19 while the position of the vehicle C indicated by the vehicle position information P is in the construction section. Accordingly, while traveling in a section of a road in a state different from normal times due to road construction being performed, it is possible to suppress occurrence of a situation where a feature different from a target feature ft indicated by the feature information F stored in the feature database DB2 is erroneously image-recognized as the target feature ft and the vehicle position information P is erroneously corrected. Further, here the correction stop processing unit 35 also stops other processing related to correction of the vehicle position information P by the vehicle position correcting unit 19. Specifically, the correction stop processing unit 35 stops the image recognition processing for position correction by the feature image recognizing unit 18. Accordingly, the calculation processing load for correction processing of the vehicle position information P can be eliminated, and the calculation processing load for image recognition processing can be eliminated. Thus, the calculation processing load on the entire navigation device 1 can be reduced.

Further, in this embodiment, the correction stop processing unit 35 performs processing of stopping the correction of the vehicle position information P by the vehicle position correcting unit 19 even when construction information W is not obtained by the construction information obtaining unit 31. Specifically, the correction stop processing unit 35 stops the function of the vehicle position correcting unit 19 also when the vehicle C travels the section of a road corresponding to a construction section according to existing construction information W stored in the construction database DB3 and until generation of learned feature information Fb is completed in this section by the feature learning unit 41, which will be described later. Accordingly, when construction according to existing construction information W is completed and while the vehicle C travels the section of a road corresponding to the construction section, it is possible to prevent occurrence of a situation where the vehicle position information P is erroneously corrected based on feature information F before the construction.

The construction information obtaining unit 31 and the correction stop processing unit 35 as has been explained are functional units that function to limit the function of the vehicle position correcting unit 19 when the vehicle C obtains new construction information W while traveling. Then, the newly obtained construction information W is stored and retained in the construction database DB3 as described above. The construction information W stored in the construction database DB3 in this manner is used for determining whether or not feature learning processing is executed for learning a feature which has a possibility of being changed by construction when the vehicle C travels in the same section of the road next time. Functional units that function to perform the feature learning processing using the existing construction information W stored in the construction database DB3 will be explained below.

12. Construction Completion Determining Unit

When the vehicle C travels the section of a road corresponding to a construction section according to the construction information W already stored in the construction database DB3, the construction completion determining unit 36 functions as a construction completion determining unit which determines completion of the construction indicated by the construction information W. Here, based on information of a construction section included in the existing construction information W stored in the construction database DB3 as shown in FIG. 9 and the vehicle position information P obtained by the vehicle position information obtaining unit 14, the construction completion determining unit 36 determines whether or not the vehicle C travels the section of the road corresponding to the construction section according to the construction information W. In this embodiment, the construction completion determining unit 36 performs this determination when the position of the vehicle C indicated by the vehicle position information P enters the section of the road corresponding to the construction section indicated by the construction information W. Then, when it determined that the vehicle C travels the section of the road corresponding to the construction section according to the existing construction information W, the construction completion determining unit 36 determines whether or not the construction indicated by this construction information W is completed.

In this embodiment, the construction completion determining unit 36 determines whether or not the construction according to the existing construction information W is completed using the following method. Specifically, when the vehicle C travels the section of the road corresponding to the construction section according to the existing construction information W, the construction completion determining unit 36 determines that the construction indicated by this existing construction information W is completed when construction information W including the same construction section is not obtained by the construction information obtaining unit 31.

This is because, when construction information W having information of the same construction section as in the existing construction information W is not obtained, it can be determined that the construction in this construction section is completed. Further, when the existing construction information W includes information of a construction period, if the construction period according to this construction information W is over when the vehicle C travels the section of the road corresponding to the construction section according to the existing construction information W, the construction completion determining unit 36 determines that the construction indicated by this construction information W is completed. This is because, when the construction information W includes information of a construction period, the completion of construction can be determined based on this information.

When it determined that construction according to existing construction information W is completed, the construction completion determining unit 36 outputs information indicating this to the target type determining unit 42, which will be described later. Accordingly, the target type determining unit 42 determines a target type which is a feature type used as a target for the image recognition processing for feature learning. Next, when the vehicle C travels the section of a road corresponding to a construction section according to existing construction information W, the feature image recognizing unit 18 executes the above-described image recognition processing for feature learning, targeting a feature of this target type. Then, based on an image recognition result of this image recognition processing for feature learning, the functional units of the feature learning unit 41 execute the feature learning processing.

13. Construction Information Deletion Determining Unit

The construction information deletion determining unit 37 functions as a construction information deleting unit which deletes, when the vehicle C does not travel the section of a road corresponding to a construction section according to the construction information W already stored in the construction database DB3 for a predetermined period, this construction information W from the construction database DB3. As shown in FIG. 9, the construction information W stored in the construction database DB3 includes information of obtained date and time. Based on this information of date and time included in the construction information W, when completion determination of this construction information W is not performed by the construction completion determining unit 36 until a predetermined period passes since the construction information W has been stored in the construction database DB3, the construction information deletion determining unit 37 deletes this construction information W from the construction database DB3. Accordingly, it is possible to suppress the data amount of the construction database DB3 from becoming excessively large. Here, the predetermined period until deleting the construction information W may be a fixed value, and is preferable to be set to a period larger enough than a normal road construction period.

14. Feature Learning Unit

The feature learning unit 41 is a unit which causes, when completion of construction is determined by the construction completion determining unit 36, the feature image recognizing unit 18 to perform image recognition processing of a feature in a construction section according to the construction information W whose completion has been determined, and generates learned feature information Fb including position information and attribute information of the image-recognized feature based on the image recognition result and the vehicle position information P. In this embodiment, as shown in FIG. 1, the feature learning unit 41 includes the target type determining unit 42, the recognized feature information generating unit 43 having a recognition position information obtaining unit 44 and a feature attribute information obtaining unit 45, the estimated position determining unit 46, the learned feature information generating unit 47, and the learning database DB4. Structures of the respective units of the feature learning unit 41 will be explained below.

15. The Target Type Determining Unit

The target type determining unit 42 functions as a target type determining unit that determines a target type which is a feature type used as a target for the image recognition processing for feature learning by the feature image recognizing unit 18. Here, when the target type determining unit 42 receives from the construction completion determining unit 36 information indicating that construction according to existing construction information W stored in the construction database DB3 is completed, it determines a target type in the image recognition processing for feature learning which is performed targeting the section of a road corresponding to a construction section according to this construction information W. In this embodiment, the target type determining unit 42 determines one target type for one construction section. At this time, the target type determining unit 42 determines a target type having a high possibility to exist in this construction section as the target type. As such a target type, first, in a construction section according to the construction information W whose completion has been determined, the same target type as a feature which existed before the construction is highly possible. Therefore, the target type determining unit 42 first obtains from the feature database DB2 feature information F having position information in the construction section according to the construction information W whose completion has been determined, and determines the feature type, which is the same as the feature according to the feature information F, as the target type. Thus, when the feature image recognizing unit 18 executes the image recognition processing for feature learning in the construction section, a feature of the same type as the feature according to the feature information F, having position information in this construction section stored in the feature database DB2, can be image-recognized with priority.

On the other hand, when the feature information F having position information in the construction section does not exist in the feature database DB2, the target type determining unit 42 determines a target type having a statistically high possibility to exist as the target type, based on a road type, a road width, the number of lanes, a link shape, and the like which are link attribute information of a link k included in the road information R. Further, the target type determining unit 42 performs processing to change the target type if it did not succeed in image recognition of a feature of this target type even when the feature image recognizing unit 18 executes the image recognition processing for feature learning a plurality of times for the same section after the target type determining unit 42 has determined the target type once. In this case, it is preferable to determine the target type in order from a target type having a statistically high possibility to exist, based on link attribute information of the link k included in the road information R. The information of the target type determined by the target type determining unit 42 is outputted to the feature image recognizing unit 18 and taken as the target type for the image recognition processing for feature learning.

16. Recognized Feature Information Generating Unit

The recognized feature information generating unit 43 functions as a recognized feature information generating unit which generates recognized feature information A representing an image recognition result of the image recognition processing for feature learning by the feature image recognizing unit 18. Here, the recognized feature information A includes recognition position information s representing a recognition position of a feature by the feature image recognizing unit 18 and feature attribute information representing an attribute of the feature. Here, the recognized feature information generating unit 43 has the recognition position information obtaining unit 44 for obtaining the recognition position information s included in the recognized feature information A, and the feature attribute information obtaining unit 45 for obtaining the feature attribute information. The recognized feature information generating unit 43 associates the recognition position information s obtained by the recognition position information obtaining unit 44 with the feature attribute information obtained by the feature attribute information obtaining unit 45 to generate recognized feature information A. Then, the recognized feature information generating unit 43 stores the generated recognized feature information A in the learning database DB4. Thus, in this embodiment, the learning database DB4 corresponds to a recognition result storage unit in the present invention.

The recognition position information obtaining unit 44 functions as a recognition position information obtaining unit which obtains, for a feature for which image recognition has succeeded in the image recognition processing for feature learning by the feature image recognizing unit 18, recognition position information s representing a recognition position of the feature. In this embodiment, the recognition position information obtaining unit 44 first monitors whether or not image recognition of a feature of the target type has succeeded in the image recognition processing for feature learning by the feature image recognizing unit 18. Then, when image recognition of a feature of the target type has succeeded, the recognition position information obtaining unit 44 derives a recognition position of this feature based on the image recognition result and the vehicle position information P obtained by the vehicle position information obtaining unit 14. Here, the recognition position information obtaining unit 44 derives the vehicle position information P at the time of obtaining image information G including an image of the feature for which recognition has succeeded as a recognition position of this feature. Then, the recognition position information obtaining unit 44 generates the recognition position information s based on information of the recognition position of the feature derived in this manner. As will be described later, in this embodiment, the recognition position information obtaining unit 44 generates recognition position information s for each feature as a learning value for a predetermined position range to which the recognition position of the feature indicated by the recognition position information s belongs. In addition, the recognition position information s of the feature obtained in this manner is derived with reference to the vehicle position information P, and hence it serves as information of the position reflecting an error included in the vehicle position information P.

The feature attribute information obtaining unit 45 functions as a feature attribute information obtaining unit which obtains, for a feature for which image recognition has succeeded in the image recognition processing for feature learning by the feature image recognizing unit 18, feature attribute information representing the attribute of the feature based on the image recognition result thereof. This feature attribute information constitutes a part of the recognized feature information A and the learned feature information Fb. Here, the attribute of the feature represented by the feature attribute information can identify at least the one feature from other features. Therefore, it is preferable that the feature attribute information includes, for example, information regarding the form of a feature such as the feature type, shape, size, and image-recognized characteristic amount of the feature, and identification information such as the feature ID for identifying the feature from other features. Information constituting such feature attribute information is generated based on the image recognition result of the feature by the feature image recognizing unit 18, or the like.

Figure 10A:
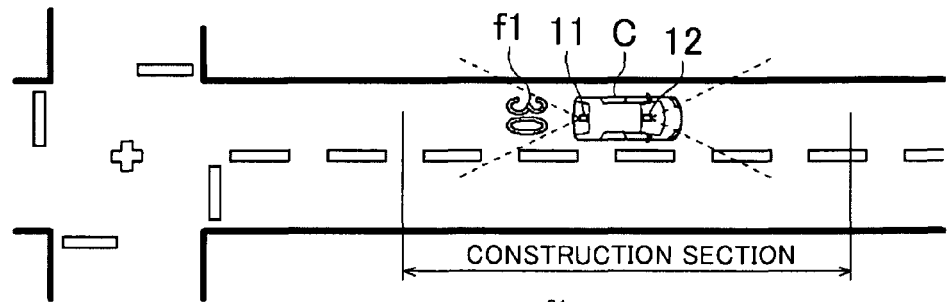
FIGS. 10A to 10C are explanatory diagrams illustrating an overview of feature learning processing based on an image recognition result of a feature.
Figure 10B:
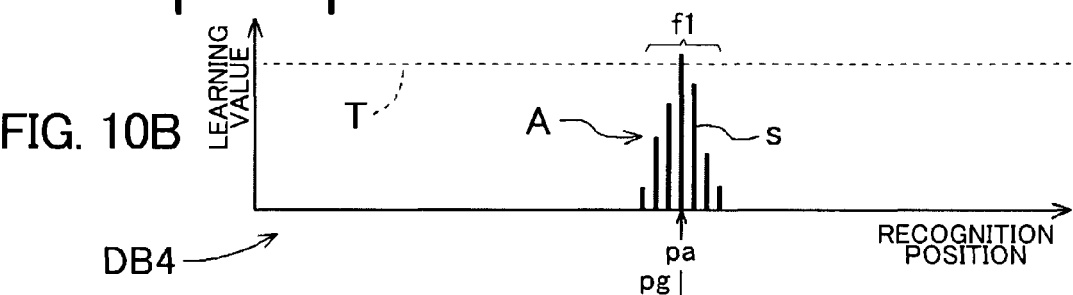
Figure 10C:
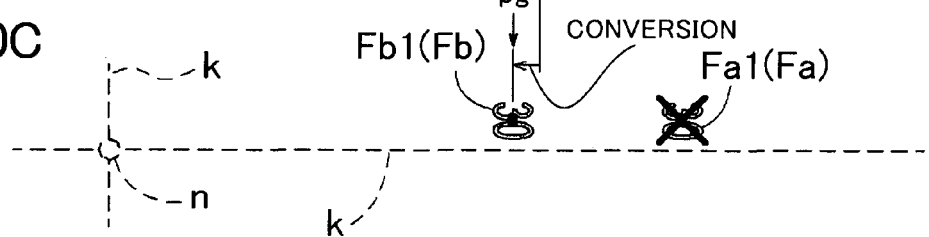

Next, details of processing performed by the recognized feature information generating unit 43 will be explained using FIGS. 10A to 10C and FIG. 11. FIGS. 10A to 10C are explanatory diagrams illustrating an overview of learning processing of feature information F based on an image recognition result of a feature. FIG. 10A is an example of a road marking (feature) provided on the actual road on which the vehicle C is traveling. In this example, in a construction section according to existing construction information W stored in the construction database DB3, a feature f1 of characters "30" representing the maximum speed limit is provided. The feature image recognizing unit 18 executes the image recognition processing for feature learning in this construction section taking the speed marking "30" as a target type. FIG. 10B is an example of recognized feature information A stored in the learning database DB4 when feature learning processing is performed under the road condition shown in FIG. 10A. FIG. 10C is an example of the feature database DB2 on which learned result stored in the learning database DB4 is reflected. In addition, the example shown in FIG. 10 shows a case where only one feature exists in the construction section according to the existing construction information W. However, there may be a case where a plurality of features exist. In this case, recognized feature information A is generated for each feature and learned.

In this embodiment, the recognition position information obtaining unit 44 generates, as shown in FIG. 10B, recognition position information s for each feature as a learning value for a predetermined position range to which the recognition position of the feature indicated by the recognition position information s belongs. Then, every time this feature is recognized, the recognized feature information generating unit 43 adds up and stores the learning value as the recognition position information s in each of the position ranges, in a state of being associated with feature attribute information obtained by the feature attribute information obtaining unit 45. In this example, the predetermined position range is a range sectioned and set for each constant distance in a direction along a link k included in road information R, and is a range sectioned by, for example, every 0.5 [m] in the direction along the link k. Further, the learning value is a value which is added, every time image recognition of one feature succeeds, for a position range to which the recognition position of the feature in the learning database DB4 belongs. For example, one point is added every time image recognition of a feature succeeds. That is, in this example, the recognition position information s is information of a learning value in each of the position ranges.

Figure 11:
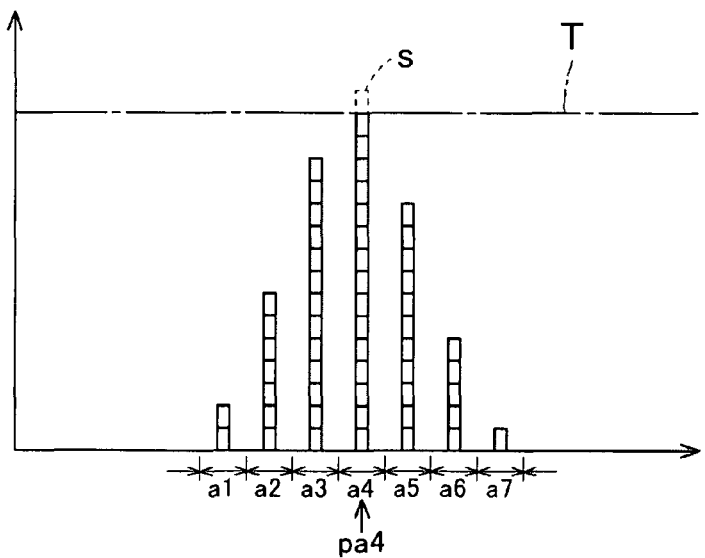
FIG. 11 is a partially enlarged diagram of a learning value stored in a learning database.

FIG. 11 is an enlarged diagram of a part of the learning value regarding the feature f1 stored in the learning database DB4 shown in FIG. 10B. For example, in the example of FIG. 10A, when image recognition of the feature f1 has succeeded and the recognition position of the feature f1 obtained by the recognition position information obtaining unit 44 is a position range shown as "a4" in FIG. 11, a value 1 is added to the learning value of this position range a4 as shown by a dashed line in this FIG. 11. Then, when the same feature f1 is image-recognized for a plurality of times due to the vehicle C passing the same road a plurality of times, learning values as a plurality of recognition position information s generated every time this feature is recognized are added and accumulated in the learning database DB4 for every position range representing the recognition position of this feature, as shown in FIG. 10B and FIG. 11. Then, as will be explained later, when the learning value becomes a predetermined learning threshold T or larger, learned feature information Fb for this feature is generated by the learned feature information generating unit 47 and stored in the feature database DB2. In the example of FIGS. 10A to 10C, the learned feature information Fb1 corresponding to the feature f1 is stored in the feature database DB2 as shown in FIG. 10C.

Further, to make a feature indicated by recognition position information s identifiable from other features, the recognized feature information generating unit 43 stores in the learning database DB4 feature attribute information of this feature obtained by the feature attribute information obtaining unit 45 in a state of being associated with the recognition position information s. Specifically, the recognized feature information A stored in the learning database DB4 includes information of learning values of the respective position ranges as recognition position information s, and feature attribute information associated therewith. As described above, this feature attribute information includes, for example, information regarding the form of a feature such as the feature type, shape, size, and image-recognized characteristic amount of this feature, and identification information such as the feature ID for identifying this feature from other features.

17. Estimated Position Determining Unit

The estimated position determining unit 46 functions as an estimated position determining unit which determines, based on a plurality of recognition position information s for a same feature that is stored in the learning database DB4 by recognizing the image of the same feature for a plurality of times, an estimated position pg of this feature. In this embodiment, based on the plurality of recognition position information s for the same feature stored in the learning database DB4, the estimated position determining unit 46 determines an estimated recognition position pa for this feature as shown in FIGS. 10B and 10C, and converts this estimated recognition position pa into the position of this feature on a road to thereby determine the estimated position pg of this feature. Specifically, based on a distribution of learning values as the plurality of recognition position information s for the same feature, the estimated position determining unit 46 first determines a representative value of this distribution as the estimated recognition position pa for this feature. Here, a mode value is used as the representative value of the distribution. More specifically, the estimated position determining unit 46 determines that a position which represents a position range, in which the learning value as recognition position information s for each feature becomes equal to or larger than the predetermined learning threshold T for the first time, is the estimated recognition position pa for this feature. As an example, a determination method in the case of determining the estimated recognition position pa of the feature f1 in the example of FIGS. 10A to 10C will be explained. As shown in FIG. 11, the learning value as the recognized feature information A for the feature f1 is equal to or larger than the learning threshold T for the first time in the position range a4. Therefore, the estimated position determining unit 46 determines the position representing the position range a4, for example, a center position pa4 of the position range a4, as the estimated recognition position pa of the feature f1.

Next, the estimated position determining unit 46 converts the estimated recognition position pa of the feature determined as described above into the position of this feature on the road so as to determine the estimated position pg of this feature. Such conversion can be performed based on a positional relationship between the vehicle C and a feature in image information G, which is theoretically obtained from an attaching position, an attaching angle, an angle of view, and the like of the back camera 11 serving as an imaging device. Then, the information representing the estimated position pg of the feature obtained in this manner by the estimated position determining unit 46 is obtained as estimated position information of this feature.

18. Learned Feature Information Generating Unit

The learned feature information generating unit 47 functions as a learned feature information generating unit which associates estimated position information representing an estimated position of each feature determined by the estimated position determining unit 46 with feature attribute information representing the attribute of this feature to thereby generate learned feature information Fb. Here, the learned feature information Fb includes feature attribute information included in recognized feature information A and estimated position information representing an estimated position pg of this feature obtained by statistically processing a plurality of recognition position information s by the estimated position determining unit 46. Specifically, the learned feature information generating unit 47 associates estimated position information representing an estimated position pg of each feature obtained by the estimated position determining unit 46 with feature attribute information included in recognized feature information A for this feature to generate learned feature information Fb. Accordingly, the learned feature information Fb is generated as information including position information and attribute information of a feature, similarly to the initial feature information Fa. Then, this learned feature information Fb generated by the learned feature information generating unit 47 is stored in the feature database DB2. In this embodiment, as shown in FIG. 10C, learned feature information Fb1 is stored in the feature database DB2 in a state of being associated with information of a link k and node n according to road information R stored in the map database DB1. Note that a dark square symbol "■" shown in this diagram represents the estimated position pg of the feature f1 indicated by the position information of the learned feature information Fb1.

Further, when it generates the learned feature information Fb in a construction section according to construction information W whose completion is determined by the construction completion determining unit 36 and stores it in the feature database DB2, the learned feature information generating unit 47 performs processing to invalidate or delete the initial feature information Fa having position information of this construction section. Accordingly, thereafter the learned feature information Fb is used instead of the initial feature information Fa for correction of vehicle position information P by the vehicle position correcting unit 19. In this embodiment, initial feature information Fa1 of the speed marking of "30" having position information in a construction section according to existing construction information W as shown in FIG. 10C is stored in the feature database DB2. Accordingly, the learned feature information generating unit 47 performs processing to invalidate this initial feature information Fa1 at the time of storing the learned feature information Fb1. In addition, in the case where learned feature information Fb having position information in a construction section according to existing construction information W has already been stored in the feature database DB2 as in a case where road construction is performed in the same section of the road a plurality of times, processing to invalidate or delete this learned feature information Fb is also performed similarly.

19. Procedure of Vehicle Position Correction/Feature Learning Processing

Figure 12:
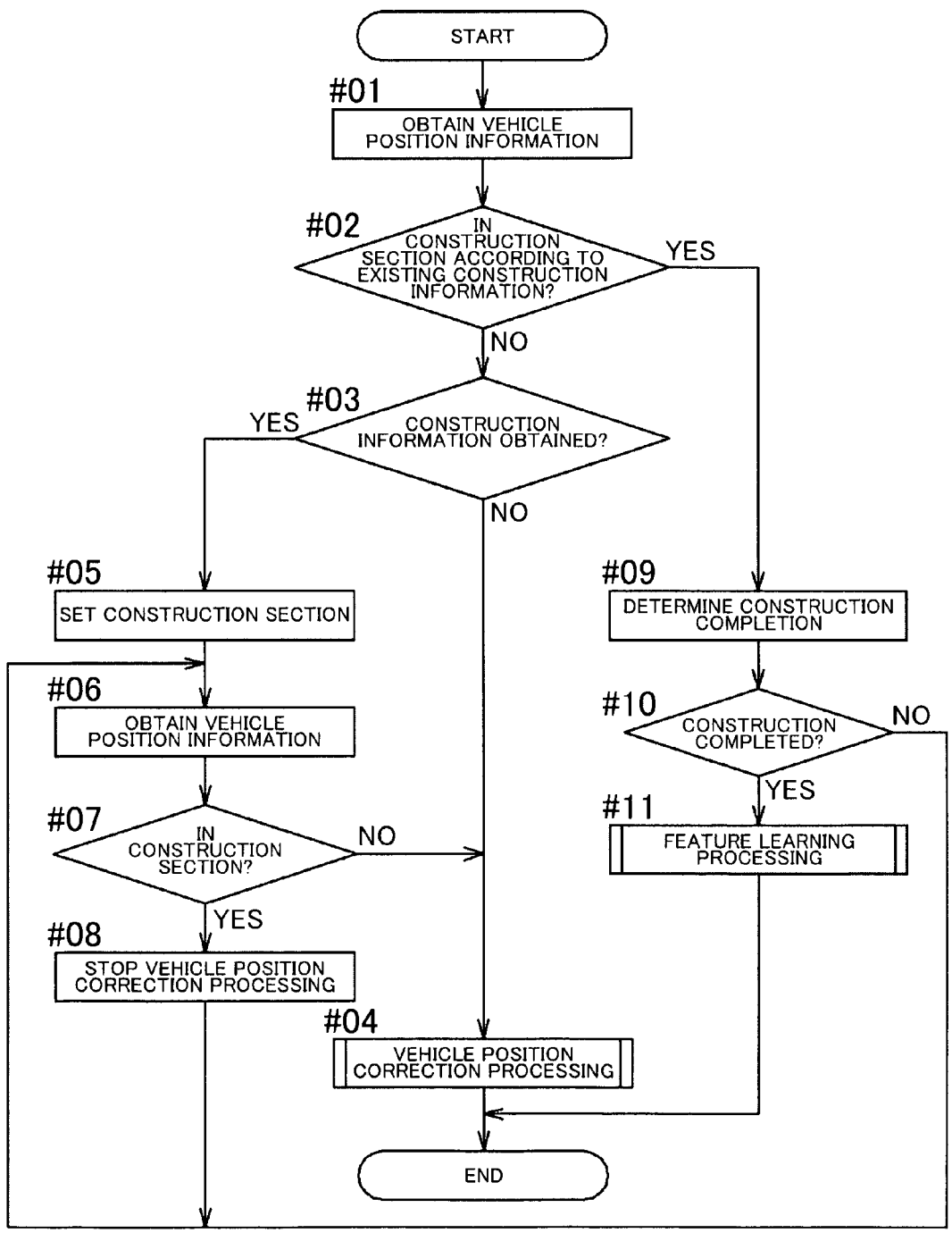
FIG. 12 is a flowchart showing the entire procedure of vehicle position correction/feature learning processing according to the embodiment of the present invention.
Figure 13:
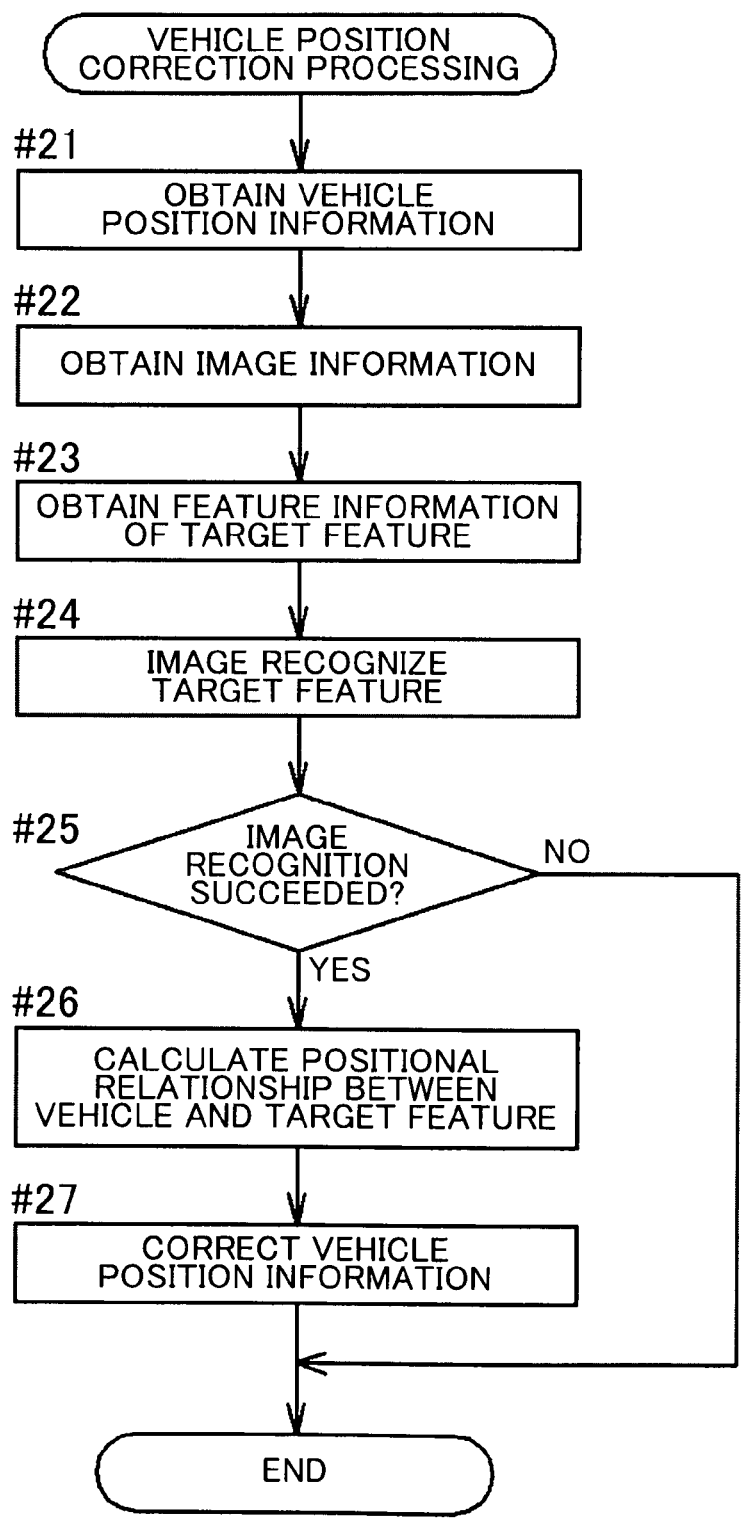
FIG. 13 is a flowchart showing a procedure of vehicle position correction processing.
Figure 14:
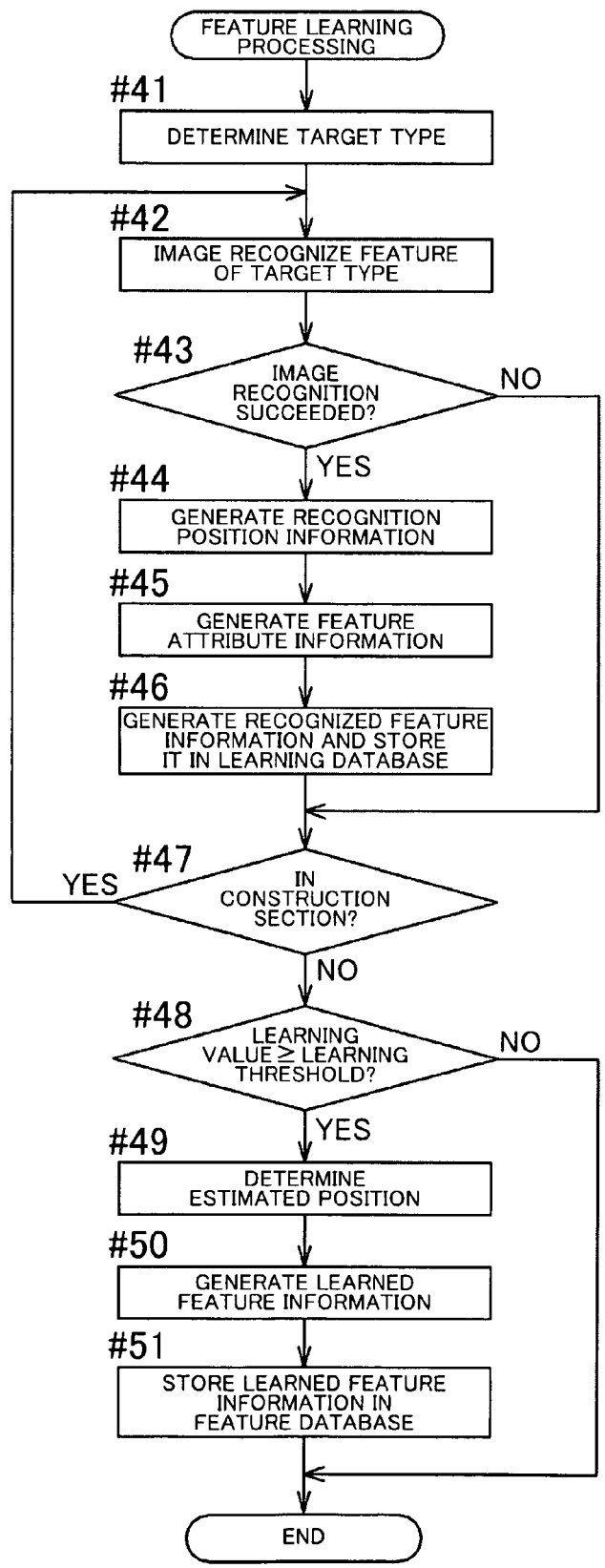
FIG. 14 is a flowchart showing a procedure of feature learning processing.

Next, a procedure of vehicle position correction/feature learning processing according to this embodiment executed in the navigation device 1 including the vehicle position recognizing device 2 and the feature information collecting device 3 will be explained. FIG. 12 is a flowchart showing the entire procedure of vehicle position correction/feature learning processing according to this embodiment. Further, FIG. 13 is a flowchart showing a procedure of vehicle position correction processing according to this embodiment, and FIG. 14 is a flowchart showing a procedure of feature learning processing according to this embodiment. Processing procedures which will be explained below are executed by hardware or software (program) or both of them constituting the above-described functional units. When the above-described functional units are constituted by a program, the arithmetic processing device included in the navigation device 1 operates as a computer that executes a vehicle position recognition program or a feature information collecting program constituting the above-described functional units. Hereinafter, explanation will be given according to the flowcharts.

As shown in FIG. 12, in the vehicle position correction/feature learning processing in the navigation device 1, first, vehicle position information P is obtained by the vehicle position information obtaining unit 14 (step #01). Then, based on the obtained vehicle position information P, it is determined whether or not the vehicle C is in a construction section according to existing construction information W stored in the construction database DB3 (step #02). This determination is performed referring to all construction information W stored in the construction database DB3 shown in FIG. 9, and it is determined that, when the position of the vehicle C indicated by the vehicle position information P obtained in step #01 is included in a construction section according to any one of construction information W stored in the construction database DB3, the vehicle C is in the construction section. When the vehicle C is not in a construction section according to existing construction information W (step #02: No), then it is determined whether or not construction information W is obtained by the construction information obtaining unit 31 (step #03). As described above, the construction information W is information including information of at least a construction section, and is received by the external information receiving unit 32 or generated by the construction information generating unit 34 based on an image recognition result of a construction symbol wt (refer to FIG. 7) by the construction image recognizing unit 33. Then, in a state that no construction information W is obtained by the construction information obtaining unit 31 (step #03: No), vehicle position correction processing by the vehicle position correcting unit 19 is executed (step #04). This vehicle position correction processing will be explained later in detail based on the flowchart shown in FIG. 13.

On the other hand, when construction information W is obtained by the construction information obtaining unit 31 (step #03: Yes), a construction section is set as a section to stop the vehicle position correction processing, based on information of a construction section included in this construction information W (step #05). Further, the vehicle position information P is obtained by the vehicle position information obtaining unit 14 (step #06). Then, based on the obtained vehicle position information P, it is determined whether or not the vehicle C is in the construction section set in step #05 (step #07). In this determination, it is determined that the vehicle C is in the construction section when the position of the vehicle C indicated by the vehicle position information P obtained in step #06 is included in the construction section set in step #05. When the vehicle C is not in the construction section (step #07: No), the vehicle position correction processing by the vehicle position correcting unit 19 is executed (step #04). Then, when the vehicle C is in the construction section (step #07: Yes), the vehicle position correction processing is stopped by the correction stop processing unit 35 (step #08). Thereafter, the processing returns to step #06, and the vehicle position correction processing is stopped until the vehicle C exits from the construction section set in step #05 (step #08).

Further, based on the vehicle position information P obtained in step #01, when the vehicle C is in the construction section according to the existing construction information W stored in the construction database DB3 (step #02: Yes), then construction completion determination is performed by the construction completion determining unit 36 to determine completion of the construction indicated by this existing construction information W (step #09). Then, when it is determined that the existing construction information W is completed (step #10: Yes), feature learning processing by the feature learning unit 41 is executed (step #11). This feature learning processing will be explained later in detail based on the flowchart shown in FIG. 14. On the other hand, when it is determined that this existing construction information W is not completed (step #10: No), the processing proceeds to step #06 and the vehicle position correction processing is stopped until the vehicle C exits from the construction section according to this existing construction information W (step #08). Thus, the entire procedure of the vehicle position correction/feature learning processing is finished.

Next, the procedure of vehicle position correction processing will be explained. As shown in FIG. 13, in the vehicle position correction processing, the navigation device 1 first obtains vehicle position information P by the vehicle position information obtaining unit 14 (step #21). Next, it obtains image information G by the image information obtaining unit 13 (step #22). In this embodiment, the feature image recognizing unit 18 performs image recognition processing of a feature, using image information G obtained by the back camera 11 as a target. Therefore, image information G captured by the back camera 11 is obtained here. Then, the feature image recognizing unit 18 obtains feature information F of a target feature ft from the feature database DB2 based on the vehicle position information P obtained in step #21 (step #23). In this embodiment, based on the vehicle position information P and the position information of a feature included in the feature information F, feature information F of one feature existing in the traveling direction of the vehicle C is obtained from the feature database DB2, and the feature according to this feature information F is set as the target feature ft.

Thereafter, the feature image recognizing unit 18 executes the image recognition processing for position correction on the image information G obtained in step #22 (step #24). When image recognition of the target feature ft has not succeeded in this image recognition processing for position correction (step #25: No), the processing is finished as it is. On the other hand, when image recognition of the target feature ft has succeeded in the image recognition processing for position correction (step #25: Yes), the vehicle position correcting unit 19 calculates a positional relationship between the vehicle C and the target feature ft based on the image recognition result of this target feature ft (step #26). Then, the vehicle position correcting unit 19 corrects the vehicle position information P based on the calculation result of step #26 and the position information of the target feature ft included in the feature information F obtained from the feature database DB2 (step #27). Thus, the procedure of the vehicle position correction processing is finished.

Next, the procedure of feature learning processing will be explained. As shown in FIG. 14, in the feature learning processing, the navigation device 1 first determines a target type by the target type determining unit 42 (step #41). As described above, the target type is a feature type used as a target for the image recognition processing for feature learning by the feature image recognizing unit 18. Next, the feature image recognizing unit 18 executes the image recognition processing for feature learning to recognize the image of a feature of the target type determined in step #41 (step #42). Then, when image recognition of a feature has not succeeded in the image recognition processing for feature learning (step #43: No), the processing proceeds to step #47. On the other hand, when image recognition of a feature has succeeded in the image recognition processing for feature learning (step #43: Yes), recognition position information s representing a recognition position of this feature is generated and obtained by the recognition position information obtaining unit 44 (step #44). Further, feature attribute information representing an attribute of this feature is generated and obtained by the feature attribute information obtaining unit 45 (step #45). Then, the recognized feature information generating unit 43 associates the recognition position information s with the feature attribute information to generate recognized feature information A, and this information is stored in the learning database DB4 (step #46).

Thereafter, it is determined whether or not the vehicle C is in a construction section according to existing construction information W according to the determination in step #02 (step #47). When the vehicle C is in the construction section (step #47: Yes), the processing returns to step #42. Therefore, until the vehicle C exits from the construction section according to this existing construction information W, the image recognition processing for feature learning is continued by the feature image recognizing unit 18, and when image recognition of a feature has succeeded, recognized feature information A of this feature is generated and stored in the learning database DB4. On the other hand, when the vehicle C exits from the construction section according to the existing construction information W (step #47: No), then it is determined whether or not a learning value as recognition position information s of a feature stored in the learning database DB4 is equal to or larger than a predetermined learning threshold T. When the learning value as the recognition position information s of a feature is smaller than the predetermined learning threshold T (step #48: No), the processing is finished as it is.

On the other hand, when the learning value as the recognition position information s of the feature stored in the learning database DB4 is equal to or larger than the predetermined learning threshold T (step #48: Yes), an estimated position pg of this feature is determined by the estimated position determining unit 46 (step #49). Thereafter, the learned feature information generating unit 47 associates the estimated position information representing the estimated position pg determined in step #49 for this feature with feature attribute information included in recognized feature information A for this feature to thereby generate learned feature information Fb (step #50). Then, the generated learned feature information Fb is stored in the feature database DB2 (step #51). Thus, the procedure of the feature learning processing is finished.

20. Other Embodiments (1) In the above-described embodiment, there is explained an example in which the correction stop processing unit 35 stops processing of the vehicle position correcting unit 19 while the position of the vehicle C indicated by the vehicle position information P is in a construction section. However, the embodiment of the present invention is not limited to this, and it is sufficient as long as processing of the vehicle position correcting unit 19 can be stopped at least while the position of the vehicle C is in a construction section. Therefore, it is also possible that the correction stop processing unit 35 is arranged to stop processing of the vehicle position correcting unit 19 within a predetermined distance before and after a construction section according to construction information W. With this arrangement, even when information accuracy is low in the construction section of the construction information W obtained by the construction information obtaining unit 31, it is possible to reliably stop processing of the vehicle position correcting unit 19 in the construction section.

(2) In the above-described embodiment, there is explained an example in which the learning threshold T is constant, for a generation condition for the learned feature information Fb by the learned feature information generating unit 47, specifically, the learning value as the recognition position information s. However, the embodiment of the present invention is not limited to this. In another preferred embodiment of the present invention, the feature learning unit 41 is arranged to compare an image recognition result of a feature by the feature image recognizing unit 18 with feature information F having position information in a construction section stored in the feature database DB2, and change the generation condition of the learned feature information Fb according to the degree of approximation therebetween. More specifically, when road construction is performed, it is possible that a feature existed in the construction section is changed, but it is also possible that the feature is not changed. Further, there may also be a case that, even when the feature is changed, only the position is moved and the feature type or the form thereof is not changed. Accordingly, considering such possibilities, it is preferable to have an arrangement in which, when the image of a feature that approximates to a feature existing before construction is recognized, learning is performed easily and learned feature information Fb is quickly generated and stored in the feature database DB2. More specifically, in another preferred embodiment of the present invention, for example, the learning threshold T is provided as a variable value, and the learning threshold T is set low when an image recognition result of a feature and feature information F having position information in a construction section almost match, or when only the position is different and the feature type and form match.

(3) As described above, when road construction is performed, it is possible that a feature existed in the construction section is changed, but it is also possible that the feature is not changed. Further, there may also be a case that, even when the feature is changed, only the position is moved and the feature type or the form thereof is not changed. Accordingly, another preferred embodiment of the present invention is arranged such that, when the content of learned feature information Fb as a result of learning of a feature by the feature learning unit 41 approximates to the initial feature information Fa, the initial feature information Fa1 is adopted and the learned feature information Fb is invalidated. With such an arrangement, it becomes possible to adopt initial feature information Fa which is prepared in advance as information having higher accuracy when a feature is not changed by road construction.

(4) In the above-described embodiment, there is explained an example in which recognition position of a feature according to recognition position information s obtained by the recognition position information obtaining unit 44 is the vehicle position information P when image recognition has succeeded. However, the recognition position of a feature according to recognition position information s is not limited to this. Therefore, in another preferred embodiment of the present invention, for example, for a target feature for which image recognition has succeeded, based on vehicle position information P and an image recognition result of image information G, the position of this feature on a road with reference to the vehicle position information P is calculated, and the position of this feature on the road is taken as the recognition position of the feature according to recognition position information s.

(5) In the above-described embodiment, there is explained an example in which the estimated position determining unit 46 is arranged to determine, based on a distribution of a plurality of recognition position information s for the same feature, the mode value of this distribution as the estimated recognition position pa of this target feature, and convert the estimated recognition position pa into the position of the feature on the road so as to determine an estimated position pg of the feature. However, the determination method of the estimated position pg by the estimated position determining unit 46 is not limited to this. Therefore, another preferred embodiment of the present invention is arranged such that, for example, based on the distribution of recognition position information s, another representative value such as an average or median of this distribution is determined as the estimated recognition position pa of this feature.

(6) In the above-described embodiment, there is explained an example in which the vehicle C is provided with both the front camera 12 and the back camera 11 as imaging devices, but the embodiment of the present invention is not limited to this. Another preferred embodiment of the present invention is arranged such that only one of the front camera 12 and the back camera 11 is provided. In this case, the navigation device 1 including the vehicle position recognizing device 2 and the feature information collecting device 3 according to the present invention performs generation of construction information W, correction of vehicle position information P, and feature learning based on an image recognition result of image information G obtained by the one imaging device. Further, as an imaging device other than the front camera 12 and the back camera 11, for example, a side camera capturing a side of the vehicle can also be used.

(7) In the above-described embodiment, there is explained an example in which the entire structure of the navigation device 1 is mounted in the vehicle C. However, the embodiment of the present invention is not limited to this. Specifically, another preferred embodiment of the present invention is arranged such that part or all of the components, except those required to be mounted in the vehicle C, such as the imaging devices (the back camera 11 and the front camera 12), the vehicle position information obtaining unit 14 and the like are provided in a server device that is provided outside of the vehicle C and is connected communicably to the vehicle C via a wireless communication line or the like.

(8) In the above-described embodiment, there is explained an example in which the feature information collecting device 3 according to the present invention is applied to the navigation device 1. However, the embodiment of the present invention is not limited to this. Therefore, it is also possible of course to apply the present invention to another structure different from that of the above-described embodiment. For example, the feature information collecting device 3 according to the present invention may be used for a map database creating device or the like.

The present invention can be preferably used for a feature information collecting device and a feature information collecting program that recognizes the image of a feature included in image information obtained from an imaging device or the like mounted in a vehicle and collects information of the feature, as well as for a vehicle position recognizing device and a navigation device using them.

What is claimed is:

1. A feature information collecting device, comprising:
   a vehicle position information obtaining unit that obtains vehicle position information representing a current position of a vehicle;
   an image information obtaining unit that obtains image information in a surrounding area of the vehicle;
   a feature image recognizing unit that performs image recognition processing of a feature included in the image information;
   a construction information obtaining unit that obtains construction information including information of a construction section;
   a construction information storage unit that stores the construction information obtained by the construction information obtaining unit;
   a construction completion determining unit that determines, when the vehicle travels a section of a road corresponding to a construction section according to the construction information already stored in the construction information storage unit, completion of construction indicated by the construction information;
   a feature learning unit that causes the feature image recognizing unit to perform image recognition processing of a feature in a construction section according to the construction information when the completion of construction is determined by the construction completion determining unit, and that generates, based on an image recognition result thereof and the vehicle position information, learned feature information including position information and attribute information of an image-recognized feature; and
   a feature database that stores initial feature information including position information and attribute information which are prepared in advance for a plurality of features, wherein
   the feature learning unit causes the feature image recognizing unit to perform image recognition in the construction section giving priority to a feature of a same type as a feature according to the initial feature information having position information in the construction section.

2. The feature information collecting device according to claim 1, wherein
   the construction information obtaining unit includes a construction information receiving unit that receives the construction information from a transmitter disposed outside of the vehicle.

3. The feature information collecting device according to claim 1, wherein
   the construction information obtaining unit includes a construction image recognizing unit that performs image recognition processing of a construction symbol included in the image information obtained by the image information obtaining unit, and a construction information generating unit that generates the construction information based on an image recognition result of a construction symbol by the construction image recognizing unit.

4. The feature information collecting device according to claim 3, wherein
   the construction image recognizing unit performs image recognition processing of at least one of a construction notice sign, a construction fence, a construction barricade, a security light, a cone, and a construction guide human model as the construction symbol.

5. The feature information collecting device according to claim 3, wherein
   the construction information generating unit sets a predetermined section with reference to a recognition position of the construction symbol as information of the construction section included in the construction information.

6. The feature information collecting device according to claim 5, wherein
   when construction symbols are included in image information of a plurality of consecutive frames, the construction information generating unit sets a start point of the construction section with reference to a recognition position of a first construction symbol included in image information of a front side of the vehicle, and sets an end point of the construction section with reference to a recognition position of a last construction symbol included in image information of a rear side of the vehicle.

7. The feature information collecting device according to claim 3, wherein
   when a construction notice sign is image-recognized as the construction symbol by the construction image recognizing unit and a construction section is recognized based on an image recognition result of the construction notice sign, the construction information generating unit sets information of a construction section included in the construction information according to a recognition result of the construction section.

8. The feature information collecting device according to claim 1, wherein
   when the vehicle travels a section of a road corresponding to a construction section according to the construction information already stored in the construction information storage unit, the construction completion determining unit determines that construction indicated by the construction information is completed when construction information including a same construction section is not obtained by the construction information obtaining unit.

9. The feature information collecting device according to claim 1, wherein when the construction information includes information of a construction period, the construction completion determining unit determines that construction indicated by the construction information is completed if the construction period according to the construction information is over when the vehicle travels a section of a road corresponding to a construction section according to the construction information already stored in the construction information storage unit.

10. The feature information collecting device according to claim 1, wherein
when the vehicle does not travel a section of a road corresponding to a construction section according to the construction information already stored in the construction information storage unit for a predetermined time period, the construction information is deleted from the construction information storage unit.

11. The feature information collecting device according to claim 1, wherein the feature learning unit comprises:
a recognition result storage unit that stores recognition position information, which represents a recognition position of a feature by the feature image recognition unit and is obtained based on the vehicle position information, and attribute information of the feature in an associated manner;
an estimated position determining unit that determines, based on a plurality of the recognition position information for a same feature, which are stored in the recognition result storage unit due to the same feature being image-recognized a plurality of times, an estimated position of the feature; and
a learned feature information generating unit that generates learned feature information by associating position information representing an estimated position of each feature determined by the estimated position determining unit with attribute information of the feature.

12. The feature information collecting device according to claim 1, wherein
the feature learning unit compares an image recognition result of a feature by the feature image recognizing unit with the initial feature information having position information in the construction section and changes a generating condition for the learned feature information according to a degree of approximation therebetween.

13. The feature information collecting device according to claim 1, further comprising:
a database that stores the learned feature information.

14. A vehicle position recognizing device, comprising:
a feature information collecting device according to claim 1; and
a vehicle position correcting unit that checks an image recognition result of a feature by the feature image recognizing unit with the learned feature information for the feature and corrects the vehicle position information.

15. A navigation device, comprising:
a vehicle position recognizing device according to claim 14;
a map database in which map information is stored;
an application program that operates referring to the map information; and
a guidance information output unit that operates according to the application program and outputs guidance information.

16. A non-transitory computer-readable storage medium storing a feature information collecting program, the program comprising:
instructions for obtaining vehicle position information representing a current position of a vehicle;
instructions for obtaining image information in a surrounding area of the vehicle;
instruction for performing image recognition processing of a feature included in the image information;
instruction for obtaining construction information including information of a construction section;
instruction for storing the obtained construction information in a construction information storage unit;
instruction for determining, when travels a section of a road corresponding to a construction section according to the construction information already stored in the construction information storage unit, completion of construction indicated by the construction information;
instruction for performing recognition processing of a feature in a construction section according to the construction information when the completion of construction is determined, and generating, based on an image recognition result thereof and the vehicle position information, learned feature information including position information and attribute information of an image-recognized feature;
instructions for accessing stored initial feature information including position information and attribute information which are prepared in advance for a plurality of features; and
instructions for performing image recognition in the construction section giving priority to a feature of a same type as a feature according to the initial feature information having position information in the construction section.

* * * * *